US011432198B2

(12) United States Patent
Berg et al.

(10) Patent No.: US 11,432,198 B2
(45) Date of Patent: Aug. 30, 2022

(54) CELL BORDER SHIFTING FOR MULTIPLE FREQUENCY BANDS

(71) Applicant: Telefonaktiebolaget LM Ericsson (publ), Stockholm (SE)

(72) Inventors: Miguel Berg, Sollentuna (SE); Olof V. Tidblad, Solna (SE); Gunther Auer, Stockholm (SE); Stefan Ström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/056,597

(22) PCT Filed: Aug. 31, 2018

(86) PCT No.: PCT/SE2018/050874
§ 371 (c)(1),
(2) Date: Nov. 18, 2020

(87) PCT Pub. No.: WO2019/226085
PCT Pub. Date: Nov. 28, 2019

(65) Prior Publication Data
US 2021/0211940 A1  Jul. 8, 2021

Related U.S. Application Data

(60) Provisional application No. 62/676,184, filed on May 24, 2018.

(51) Int. Cl.
*H04W 28/18* (2009.01)
*H04W 16/10* (2009.01)
(Continued)

(52) U.S. Cl.
CPC .......... *H04W 28/18* (2013.01); *H04W 16/10* (2013.01); *H04W 16/18* (2013.01);
(Continued)

(58) Field of Classification Search
CPC ..... H04W 28/18; H04W 16/10; H04W 16/18; H04W 28/0226; H04W 28/26; H04W 72/0426; H04W 88/085; H04W 24/02
See application file for complete search history.

(56) References Cited

U.S. PATENT DOCUMENTS 6,711,404 B1 * 3/2004 Arpee ................... H04W 16/18
455/67.11
11,212,153 B2 * 12/2021 Nakayama .......... H04W 56/001
(Continued)

FOREIGN PATENT DOCUMENTS

| EP | 1 643 783 A1 | 4/2006 |
| EP | 2 709 393 A1 | 3/2014 |
| EP | 2 292 075 A1 | 12/2017 |

OTHER PUBLICATIONS

Ericsson Review, Connecting the dots: small cells shape up for high-performance indoor radio by Chenguang Lu et al.—Dec. 19, 2014.
(Continued)

*Primary Examiner* — Harry H Kim
(74) *Attorney, Agent, or Firm* — Baker Botts, LLP

(57) ABSTRACT

According to certain embodiments, a method by a network node (860) for shifting cell borders of multiple frequency bands includes deploying at least two frequency bands. Each of the at least two frequency bands have at least two cells, and each cell have an associated cell coverage area within a common target coverage area. Each of the at least two frequency bands are associated with a respective interference area along a respective cell border, and each interference area is characterized by interference from an adjacent cell. The associated cell coverage area of at least one of the at least two frequency bands is adjusted such that the respective cell border of the at least one of the at least two frequency bands is shifted to reduce a common interference
(Continued)

Band A coverage areas  Band B coverage areas  Band A+B total coverage area area of the at least two frequency bands. The common interference area is an area where the respective cell borders of the at least two frequency bands overlap.

24 Claims, 24 Drawing Sheets

(51) Int. Cl.
    *H04W 16/18*     (2009.01)
    *H04W 28/02*     (2009.01)
    *H04W 28/26*     (2009.01)
    *H04W 72/04*     (2009.01)
    *H04W 88/08*     (2009.01)
    *H04W 24/02*     (2009.01)

(52) U.S. Cl.
    CPC ....... *H04W 28/0226* (2013.01); *H04W 28/26* (2013.01); *H04W 72/0426* (2013.01)

(56) References Cited

U.S. PATENT DOCUMENTS

| | | |
|---|---|---|
| 2007/0249340 A1 | 10/2007 | Hiltunen et al. |
| 2008/0057933 A1 | 3/2008 | Brunner |
| 2013/0244669 A1* | 9/2013 | Das .................. H04W 84/10 455/446 |
| 2015/0327080 A1* | 11/2015 | Claussen ............. H04W 16/10 370/338 |
| 2017/0373737 A1 | 12/2017 | Liang et al. |
| 2019/0165983 A1* | 5/2019 | Nakayama .......... H04W 72/046 |

OTHER PUBLICATIONS

A High-Capacity Wireless Network By Quad-Sector Cell and Interleaved Channel Assignment by Li-Chun Wang; IEEE Journal on Selected Areas in Communications, vol. 18, No. 3—Mar. 2000.

LTE Seamless Mobility Demonstrated With Combined Cell in a Neterogeneous Network by Arne Simonsson; Globecom 2013 Workshop—Heterogeneous and Small Cell Networks—2013.

Real-Life Indoor Mimo Performance With Ultra-Compact Lte Nodes by Arne Simonsson et al.—2015.

PCT Written Opinion of the International Searching Authority issued for International application No. PCT/SE2018/050874—dated Dec. 13, 2018.

PCT Internatinoal Search Report issued for International application No. PCT/SE2018/050874—dated Dec. 13, 2018.

* cited by examiner

CELL BORDER SHIFTING FOR MULTIPLE FREQUENCY BANDS

PRIORITY

This nonprovisional application is a U.S. National Stage Filing under 35 U.S.C. § 371 of International Patent Application Serial No. PCT/SE2018/050874 filed Aug. 31, 2018 and entitled "Cell Border Shifting for Multiple Frequency Bands" which claims priority to U.S. Provisional Patent Application No. 62/676,184 filed May 24, 2018 both of which are hereby incorporated by reference in their entirety.

BACKGROUND

Cells with multiple distributed transmission and reception points (TRPs) have been used to cover signal dead spots or to increase the system capacity. They are useful in indoor environments with complex floor plans, including inner walls and elevator shafts, which will cause many signal dead spots (or coverage holes).

Though this disclosure discusses small cells with multiple TRPs, the techniques discussed herein are applicable to cells other than small cells with one or more TRPs. TRPs may not necessarily be collocated. The signal processing of the small cells is assumed to be carried out at a central unit (CU), which includes signal generation on the downlink as well as signal combining and detection on the uplink. One cell is composed of $N_{node}$ nodes, and one central unit may serve up to $N_{cell}$ cells. FIG. 1 illustrates an example of one such small cell with 4 nodes where each node contains one TRP. Specifically, FIG. 1 illustrates the structure of distributed small cells with pooled baseband. Each node, $n_i$, i=1, ..., 4, contains a TRP. The received signals are combined in the central unit (CU).

A distributed antenna system (DAS) has a similar architecture as shown in FIG. 1, where TRPs are called antenna heads and the RF radio signal is conveyed through a passive distribution by coaxial cables. A DAS naturally supports multiple frequency bands since the RF signal is directly transmitted through the coax cable, as long as the carrier frequency does not exceed the upper frequency limit of the coax cable and as long as the carrier frequency is within the supported frequency range(s) of antenna heads, couplers, and power splitters.

Ericsson's Radio Dot System (RDS) (See, *Connecting the dots: Small Cells shape up for high-performance indoor radio*, Dec. 19, 2014) is a special case of the general architecture illustrated in FIG. 1.

FIG. 2 illustrates the major building blocks of RDS where each radio dot comprises one TRP and could have multiple antenna branches (e.g. 2 or 4). A number of radio dots are connected to an indoor radio unit (IRU) using local area network (LAN) cables in a star topology. The IRU performs signal combining and splitting as well as some digital front end (DFE) functions such as carrier filtering. Each IRU is connected via a common public radio interface (CPRI) to a baseband unit (BBU) or baseband processing unit (BPU) where all baseband processing is carried out. As used herein the BBU or BPU may be referred to as a digital unit (DU). Thus, as illustrated in FIG. 2, the structure of indoor small cells includes one DU being connected to four IRUs, each with one CPRI link, such that each IRU serves four radio dots using LAN cables in a star topology. As noted above, each radio dot may have, for example, two antennas (not shown).

With respect to FIG. 1, the central unit (CU) is comprised of IRU, CPRI and DU. In the basic configuration, a cell is constituted by all radio dots connected to a single IRU. These radio dots will transmit the same signal similar to a distributed antenna. Other configurations are also possible. For example, the radio dots associated to all 4 IRUs in FIG. 2 may be configured to accommodate one bigger cell using a "combined cell" feature. (See, *LTE Seamless Mobility Demonstrated with Combined Cell in a Heterogenous Network*, Dec. 9-13, 2013). All TRPs in a combined cell broadcast the same cell id and, thus, look like the same cell to the UEs but each radio unit (e.g. IRU) can have individually scheduled radio resources (if UEs support 3GPP release 10 and newer). Thus, for a given radio dot deployment, applying combined cell can give higher capacity over the service area compared with increasing the number of radio dots per IRU. The cost is increased computational complexity in baseband processing.

On the downlink, the transmitted baseband signal is generated in the digital unit (DU). The transmit signal stream is sent to the IRU over a CPRI link. In case of an analogue interface between radio dot and IRU, the digital input signal is transformed to an analog waveform at an intermediate frequency (IF) and sent to the each TRP over LAN cables. Alternatively, a digital interface transmits a sampled signal stream between IRU and radio dots, and the analogue waveform is generated at the radio dot. The digital interface allows different options for the sampled signal stream, e.g. complex baseband representation or bandpass sampled IF. At the TRPs, the signal is radiated over the wireless channel to the UEs.

On the uplink, the signal transmitted from one UE will be received by multiple TRPs, and the received signals of TRPs will be sent through LAN cables to the IRU for further processing. Inside the IRU, the received signals will be combined by adding signals from different TRPs. If an analogue interface is used between IRU and TRP, the signal will also be digitized by an analog-to-digital (A/D) converter. For a digital interface, the A/D conversion is performed in each TRP. The resulting digital samples will be sent through the CPRI link to the DU, where all baseband processing is carried out, such as (de)modulation, detection, channel estimation, decoding, etc. One DU is capable of supporting multiple IRUs. For the example in FIG. 2, one DU serves 4 IRUs, and each IRU serves 4 radio dots.

As described above, RDS is a distributed small cell solution which connects the central unit with the TRPs by means of a LAN cable. LAN cables consist of 4 pairs of twisted copper wires. Each wire has small conductor diameter compared with common coax cables, and smaller diameter means higher attenuation per length unit. Thus, the maximum TRP signal bandwidth that can be supported, denoted as the instantaneous bandwidth (IBW), is also smaller than that of a coax cable. To some extent, this is mitigated by the fact that the LAN cable contains multiple pairs that can be used simultaneously, to support wider bandwidth, more bands, and/or more antenna branches.

As an example, first generation RDS with analogue interface uses two pairs in the LAN cable to support a single band with 2-branch multiple-input-multiple-output (MIMO). Here, each branch uses one pair in the LAN cable. Thus, only half of the cable's 4 pairs are used, which means that a single LAN cable is sufficient to support two bands without reducing IBW per band.

FIG. 3 illustrates an RDS configured for dual-band operation on frequency bands B1 and B2. Separate IRUs and radio dots are here required for each band but each IRU and radio dot supports 2 MIMO branches where each MIMO branch uses one pair. The 2 transmit and 2 receive (2T2R) signal streams per band connecting IRU and radio dot for B1 and B2 are fed through a single LAN cable by means of Y-connectors, thus using all 4 pairs. Such cable sharing saves cost during deployment.

An alternative solution for dual band transmission is to replace the two single band radio dots in FIG. 3 by a dual-band radio dot. FIG. 4 illustrates a radio dot system with dual-band radio dots. In this case, no Y-connector is needed on the radio dot side.

For a digital interface between IRU and radio dot, Digital Subscriber Line (DSL) based technologies could work with the Y-connectors. However, for twisted-pair Ethernet (xBASE-T), all versions above 100 Mbps use all four pairs simultaneously for a single connection. Thus, if Ethernet is used, Y-connectors cannot be used, but dual band operation could still be supported by one of the following methods:

- A configuration as in FIG. 3 or FIG. 4 where the Y-connectors are replaced with Ethernet switches (or some type of digital multiplexers for non-packet transport). Two switches are required for the case in FIG. 3 (one at each end of the cable) and one switch for the case in FIG. 4 (one at the IRU end of the cable).
- A configuration where both IRU and radio dot natively supports dual band operation. In this case, some type of switching or multiplexing would be built into the IRU and radio dot.

However, there exist certain challenges. There is an increased demand to support high mobile network capacity across multiple indoor and semi-indoor venues such as Airports, Stadiums, Arenas and Convention centers. Small-Cell configurations are required to meet the increasing capacity requirements in these and similar venues. In order to support the increased capacity demands in mobile cellular systems such as LTE today, and upcoming 5G systems tomorrow, frequency bands and/or multiple antennas are added. In addition, cell sectorization is applied.

Adding frequency bands increases the available bandwidth of the mobile communication system and therefore serves a proportional increase of the achieved capacity. Together with carrier aggregation (CA), multiple bands can be accessed in an opportunistic fashion by one user exclusively, providing high peak user throughput, or separated between multiple users, allowing users to access that part of the available frequency resources for which they experience favorable channel conditions.

Adding multiple antennas at the transmitter and the receiver, known as multiple-input multiple-output (MIMO) is another means to increase the capacity of wireless networks. MIMO is an integral part of 4G and 5G mobile communication systems.

Increasing the numbers of cells (also known as sectors) reduces the area served by an individual cell, which in turn means that less users are to be served by each cell. Hence, less traffic needs to be served per cell and more resources are available per user. On the other hand, increasing the number of cells in a confined area inevitably means that some of the radiated signal energy is leaking to adjacent cells and observed as interference. This effect is known as inter-cell interference. This inter-cell interference is pronounced by the fact that modern mobile networks try to maximize network capacity by reusing the same radio resources (time- and frequency-slots) in every cell. Especially, users located close to the cell boundary are exposed to high interference and will therefore experience a poor SINR (signal to interference plus noise ratio). The increased cell densities come at an increased cost of cell interference, since a large part of the coverage area will consist of cell borders. Another problem with very dense cells is frequent handovers, which is undesirable since it increases control channel signaling and also means increased risk of dropping an ongoing connection.

FIG. 5 illustrates a Distributed Antenna System (DAS). As shown, the baseband DU serves two cells, and each cell consists of a number of antenna heads. In existing indoor solutions, such as the DAS shown in FIG. 5, multiple antenna heads constitute one cell/sector. As discussed above, the antenna heads, also known as TRPs, that are associated to one cell, transmit identical radio signals. To the mobile receiver, these multiple TRPs per cell will appear as a single transmitter, as the mobile is not able to distinguish between the transmission sources. Grouping a number of TRPs to one cell allows to control the inter-cell interference, but it also increases the area covered by one cell, which ultimately limits the attainable network capacity.

In order to meet the envisaged demands for high capacity venues in the future, a combination of increasing spectrum, number of antennas, and number of cell/sectors is required. For existing solutions based on a DAS architecture, all frequency bands have the same geographical coverage area as cells/sectors are based on common RF distribution. This means that users located close to cell boundaries will experience poor SINR for all frequency bands and, in turn, low user throughput.

For venues with high user density in open area sections, high sectorization generates severe cell geometry degradation. For example, the increased cell densities come at an increased cost of cell interference since a large part of the coverage area will consist of cell borders having interference from adjacent cells.

As a result, capacity and user performance are degraded in areas of overlapping coverage.

SUMMARY

Certain aspects of the present disclosure and their embodiments may provide solutions to these or other challenges by mitigating the effect of cell border interference.

According to certain embodiments, a method by a network node (860) for shifting cell borders of multiple frequency bands includes deploying at least two frequency bands. Each of the at least two frequency bands have at least two cells, and each cell have an associated cell coverage area within a common target coverage area. Each of the at least two frequency bands are associated with a respective interference area along a respective cell border, and each interference area is characterized by interference from an adjacent cell. The associated cell coverage area of at least one of the at least two frequency bands is adjusted such that the respective cell border of the at least one of the at least two frequency bands is shifted to reduce a common interference area of the at least two frequency bands. The common interference area is an area where the respective cell borders of the at least two frequency bands overlap.

According to certain embodiments, a network node is provided for cell border shifting for multiple frequency bands. The network node includes memory operable to store instructions and processing circuitry operable to execute the instructions to cause the network node to deploy at least two frequency bands. Each of the at least two frequency bands have at least two cells, and each cell have an associated cell coverage area within a common target coverage area. Each of the at least two frequency bands are associated with a respective interference area along a respective cell border, and each interference area is characterized by interference from an adjacent cell. The processing circuitry is further operable to execute the instructions to cause the network node to adjust the associated cell coverage area of at least one of the at least two frequency bands such that the respective cell border of the at least one of the at least two frequency bands is shifted to reduce a common interference area of the at least two frequency bands. The common interference area is an area where the respective cell borders of the at least two frequency bands overlap.

According to certain embodiments, a method for cell border shifting for multiple frequency bands includes deploying at least two frequency bands. Each of the at least two frequency bands is associated with a cell coverage area within a target coverage area. The cell coverage area of at least one of the two frequency bands is adjusted to minimize a common interference area of the two frequency bands.

Certain embodiments may provide one or more of the following technical advantages. For example, one technical advantage may be that, by adjusting each involved frequency band's coverage area so that their common interference border areas are minimized, certain embodiments may provide high cell geometry for at least one of the bands at every location, ensuring good signal quality, typically measured as Signal to Interference and Noise Ratio (SINR). As such, another technical advantage may be that the resulting aggregated user throughput avoids areas with degraded user throughput.

Still another technical advantage of certain embodiments may that user devices (or User Equipment, UE) used in the solution covered area will be able to aggregate carriers from multiple frequency bands. With high signal quality on multiple bands in a majority of the area, and at least one of the bands having high signal quality even in cell border interfered areas, the user devices' Carrier Aggregation feature will provide high-end user performance across the total area by continuously adapting to each frequency band's signal quality.

Still another advantage may be that a major disadvantage of implementing small cells in open coverage areas is avoided. Yet another advantage may be that certain embodiments involve a new methodology to combine distributed MIMO with multi band Carrier Aggregation for cell border interference mitigation. Another advantage still may that certain embodiments enable algorithm-based automation of methodology in planning tools. Still another advantage may be that certain embodiments enable algorithm-based automation of methodology in radio network nodes.

DETAILED DESCRIPTION

Figure 1:
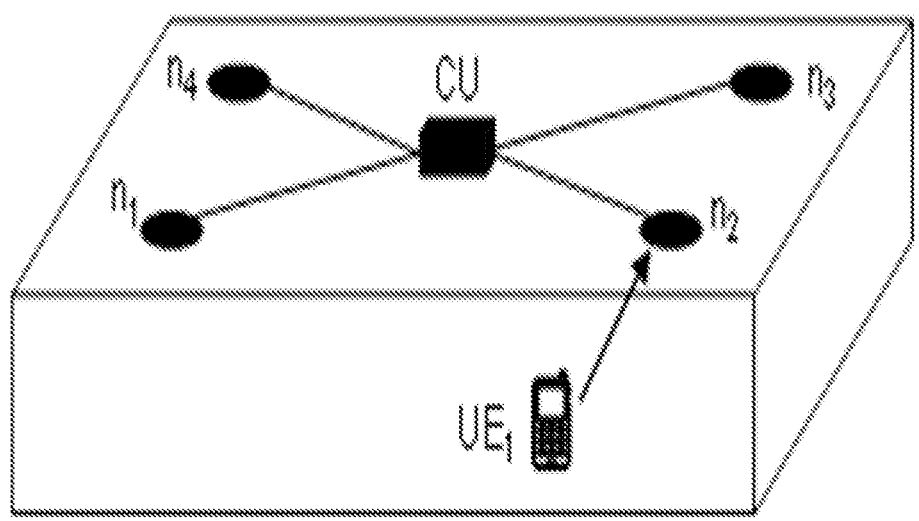
FIG. 1 illustrates an example of one such small cell with 4 nodes where each node contains one transmission reception point (TRP).
Figure 2:
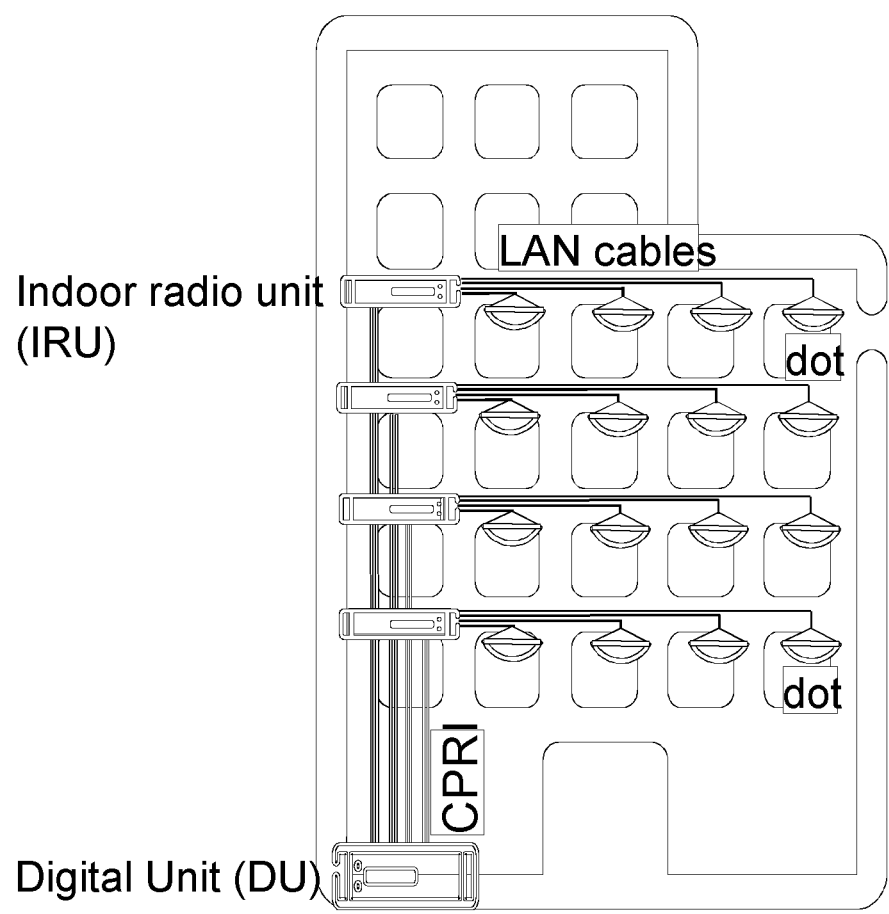
FIG. 2 illustrates the major building blocks of radio dot system (RDS) where each dot comprises one TRP and could have multiple antenna branches.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a more general term "network node" may be used and may correspond to any type of radio network node or any network node, which communicates with a UE (directly or via another node) and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

According to certain embodiments, a method is proposed to mitigate the effect of cell border interference by deploying at least two frequency bands. For purposes of this disclosure a frequency band is here defined as the frequency spectrum occupied by one or more carriers. Multiple frequency bands can be adjacent or separated in frequency. Cell coverage area per band is designed and shifted spatially to reduce common interference areas to an absolute minimum across the targeted coverage area. This may be referred to herein as border shifting and may include cell border shifting or frequency border shifting. The scheduler may assign cell edge users on one band to the other band. Due to the shifted cell borders users are likely to observe favorable SINR conditions on one of the two bands. SINR of scheduled resources at cell boundaries is therefore substantially improved.

According to certain embodiments, in combination with the method for border shifting described immediately above, at least 3 TRPs per cell may be deployed in a distributed small cell solution, such as the Ericsson Radio Dot System. The cell borders may be shifted spatially by assigning a subset of the TRPs the same cell ID for both frequency bands, while the remaining TRPs are assigned different cell IDs for each band.

Figure 6:
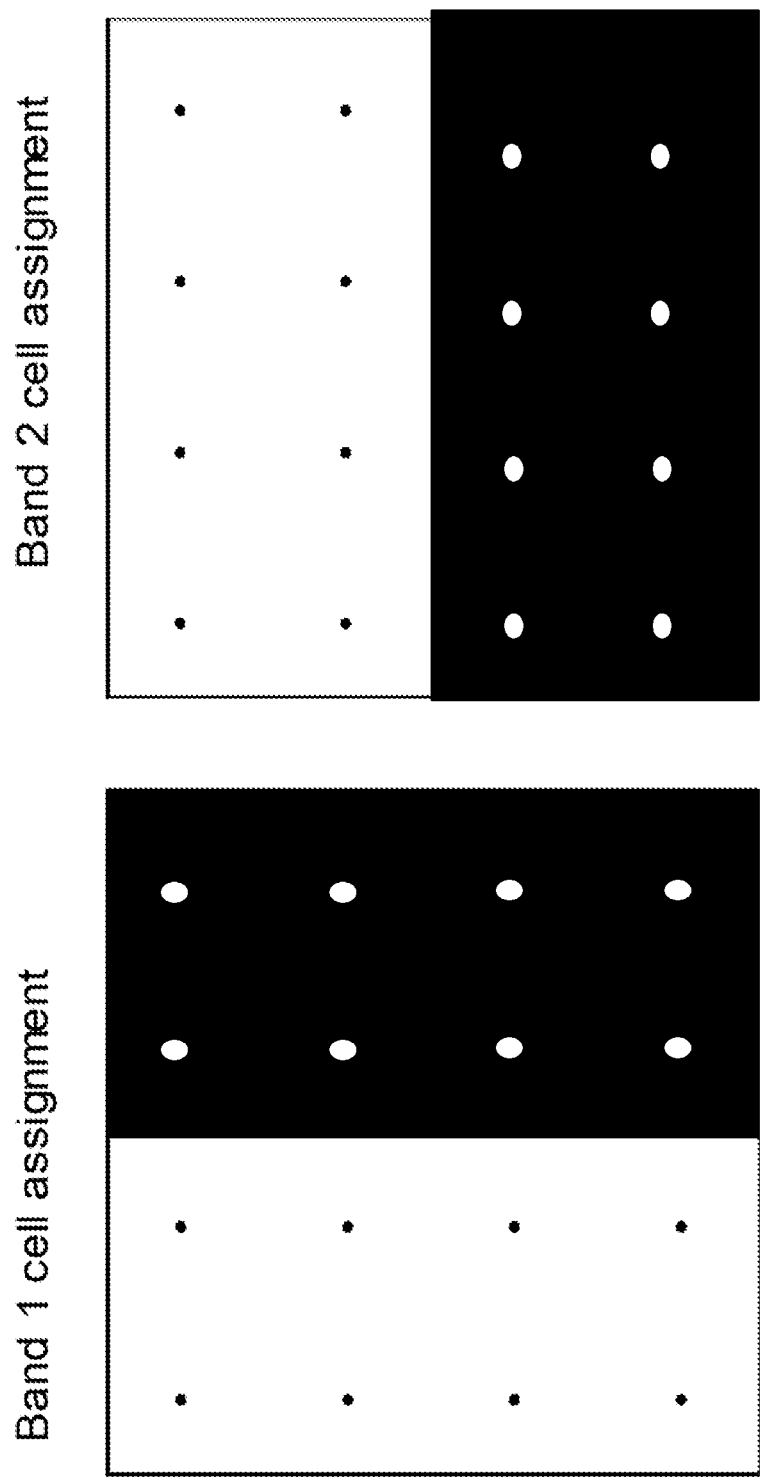
FIG. 6 illustrates the principle of cell border shifting applied to a distributed small cell solution, according to certain embodiments.

FIG. 6 illustrates the principle of cell border shifting applied to a distributed small cell solution, according to certain embodiments. Prior to shifting, the regions near the cell boundaries may have poor SINR. However, cell border shifting combined with a scheduler that schedules a user device to the frequency band with favorable SINR, the aggregated throughput mitigates the dip typically observed at areas close to cell borders. Stated differently, prior to shifting, if the interference regions between cells are located along the same lines for all the different bands, none of the bands will provide a particularly useful signal in those regions and throughput will be low. Whereas, where the interference regions of the different bands are not located in the same place, there will always be a band which is not heavily interfered and thus no throughput wells (except perhaps where the interference regions need to cross one another). Accordingly, as shown in FIG. 6, the cell boundaries between the two bands are shifted, so that each band has an individual cell with as little overlap as possible.

According to certain embodiments, in combination with the method for border shifting described above and the method for deploying at least 3 TRPs per cell in a distributed small cell solution, distributed multiple-input, multiple-output (MIMO) may be applied to further improve performance on the borders between coverage areas, in certain embodiments. Specifically, distributed MIMO such as, for example, 4T4R MIMO, realized over, for example 8 or 16 2T2R antenna points may be used to increase physical cell size in a distributed small cell solution such as the Ericsson Radio Dot System.

Thus, according to certain embodiments, a method for cell border shifting for multiple frequency bands uses a combination of TRP placement and shifting of frequency band borders across a targeted coverage area. As disclosed herein, TRPs may also be referred to as, for example, antenna heads, antenna nodes, antenna point units, radio heads, or small-cell access points. The innovation is based on each TRP having a unique signal transmission path from radio baseband, or from an intermediate radio hub or radio unit, to RF front end, allowing for shifting both MIMO layers and frequency band borders across a MIMO multi-band coverage area. Though the concept may be explained using the Ericsson Radio Dot System, as an example, the methods disclosed herein are applicable to other distributed systems, including any main-remote or other type of distributed system.

The innovation applies to cells defined by multiple TRPs. If individual TRPs, or a group of such TRPs, have its own signal transmission path, it may be possible to move those TRPs from one cell to another. If dual-band TRPs are used, each band needs an individual signal transmission path for at least some of the TRPs in order to be able to shift the cell border for one of the bands only. Having its own signal transmission path may mean, for example, a dedicated LAN cable, dedicated twisted pairs per band for an analogue interface, or a dedicated slot or packet stream for a digital interface, or a separate wavelength (frequency) to the radio baseband for each band, or to an intermediate radio hub or radio unit. This allows for shifting frequency band borders across a multi-band coverage area. This is typically not possible for passive DAS systems, since the coax cable conveys the signals of all bands. Thus, cell border shifting is not possible for traditional DAS systems without a substantial increase in hardware, in the form of individual coax cables for a sub-set of the served frequency bands.

Figure 7:
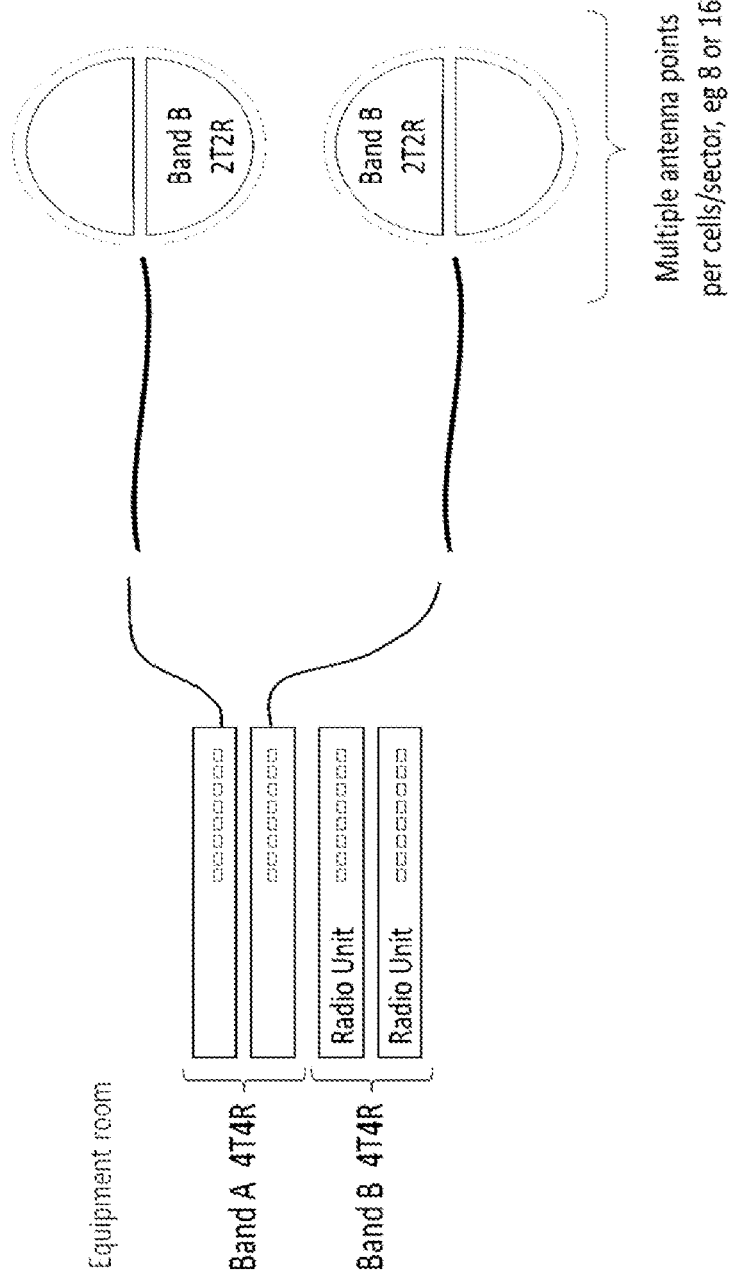
FIG. 7 illustrates connectivity from radio units/radio hubs, to the small cell antenna point units, according to certain embodiments.

FIG. 7 illustrates connectivity from radio units/radio hubs, to the small cell antenna point units. The connection may be realized over Twisted Pair category cable, like CAT6A, or over fiber. In the depicted embodiment, each antenna point unit supports two frequency bands, each with two transmit and two receive branches (2T2R) but other configurations are also possible. Each Radio Unit can support multiple antenna point units per cell.

Figure 8:
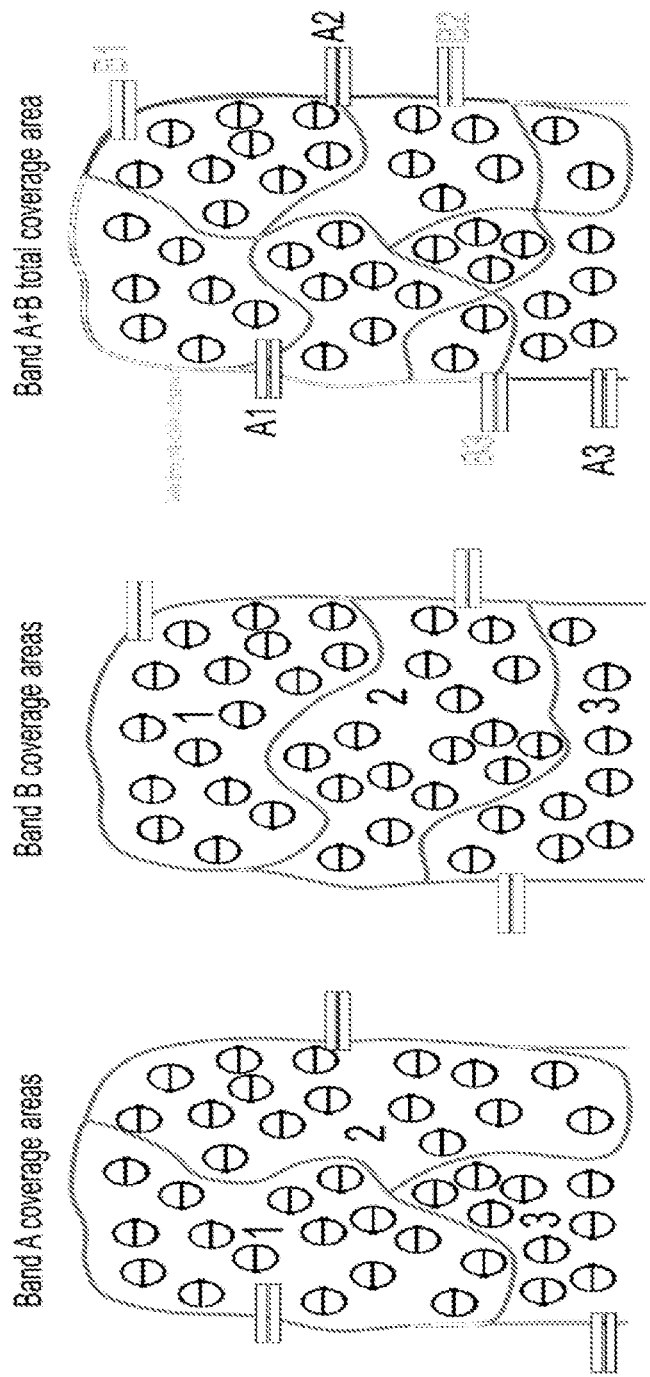
FIG. 8 illustrates border shifting principle of for example, 2 bands, Band A and Band B, according to certain embodiments.

FIG. 8 illustrates border shifting principle of for example, 2 bands, Band A and Band B, according to certain embodiments.

In the depicted embodiment of FIG. 8, Band A and B coverage areas are different. Specifically, Band A coverage areas are larger in the vertical direction while Band B coverage areas are larger in the horizontal direction. Other alternatives might also be possible, such as, for example, using same cell shape but shifted horizontally and/or spatially. In certain cases, Distributed MIMO might be possible between coverage areas with different numbers, i.e. at the border between coverage areas. This may further improve performance.

Figure 9:
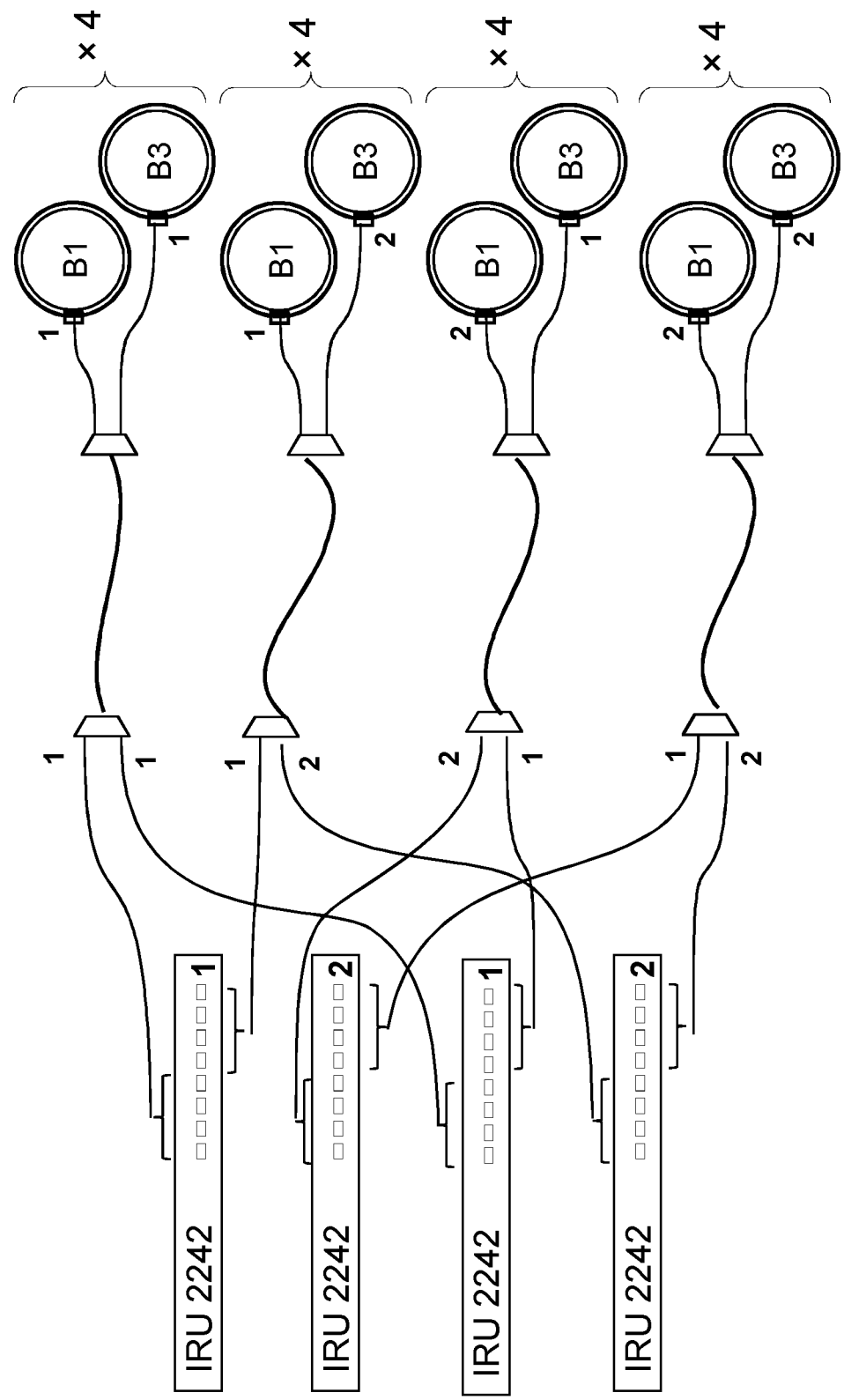
FIG. 9 illustrates an example cell border shifting configuration for a dual band radio dot system with single band radio dots, according to certain embodiments.

FIG. 9 illustrates an example cell border shifting configuration for a dual band radio dot system with single band radio dots, according to certain embodiments. Cell border shifting is realized by assigning 4 radio dots of each band to the same cell as their co-located counterpart while the remaining 4 radio dots are assigned to different cells.

Figure 3:
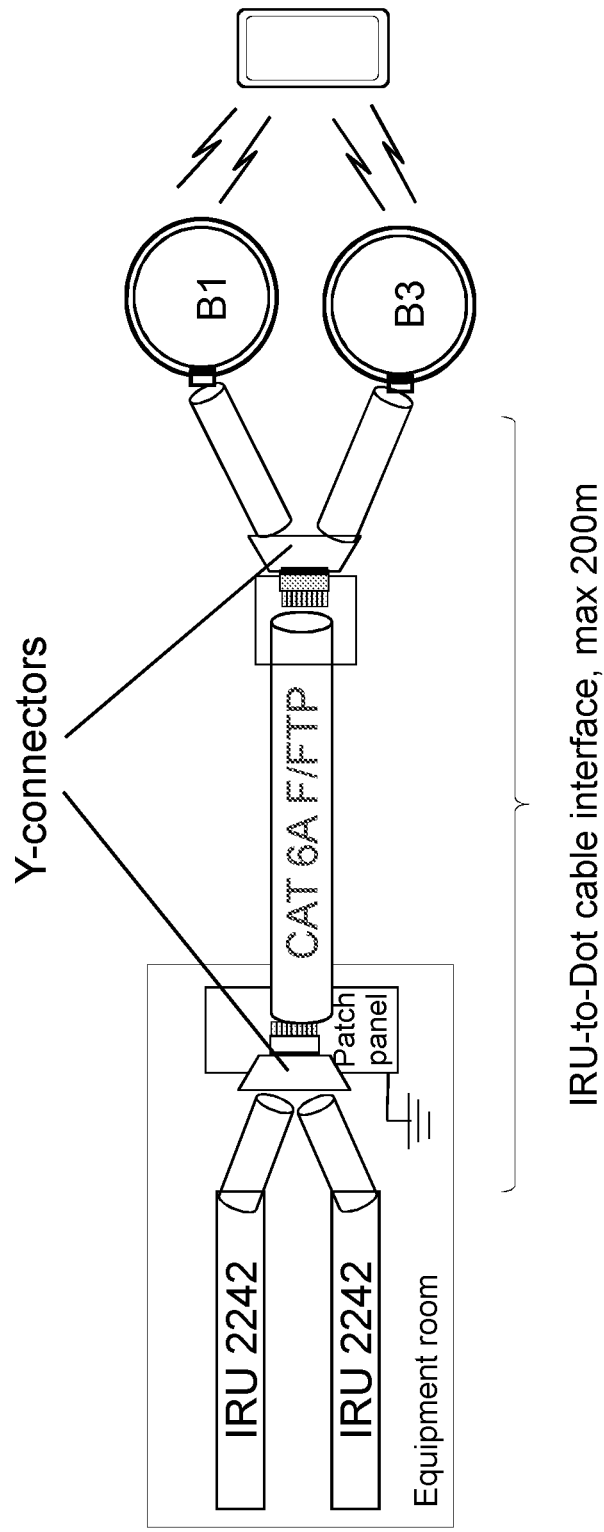
FIG. 3 illustrates an RDS configured for dual-band operation on frequency bands B1 and B2.

For analogue interface, Y-connectors are used at each end of the cable as in FIG. 3 described above to allow cable sharing. For digital (Ethernet) interface, Ethernet switches may be used instead. The Ethernet switches may be external or built into the IRUs and/or dots.

Figure 10:
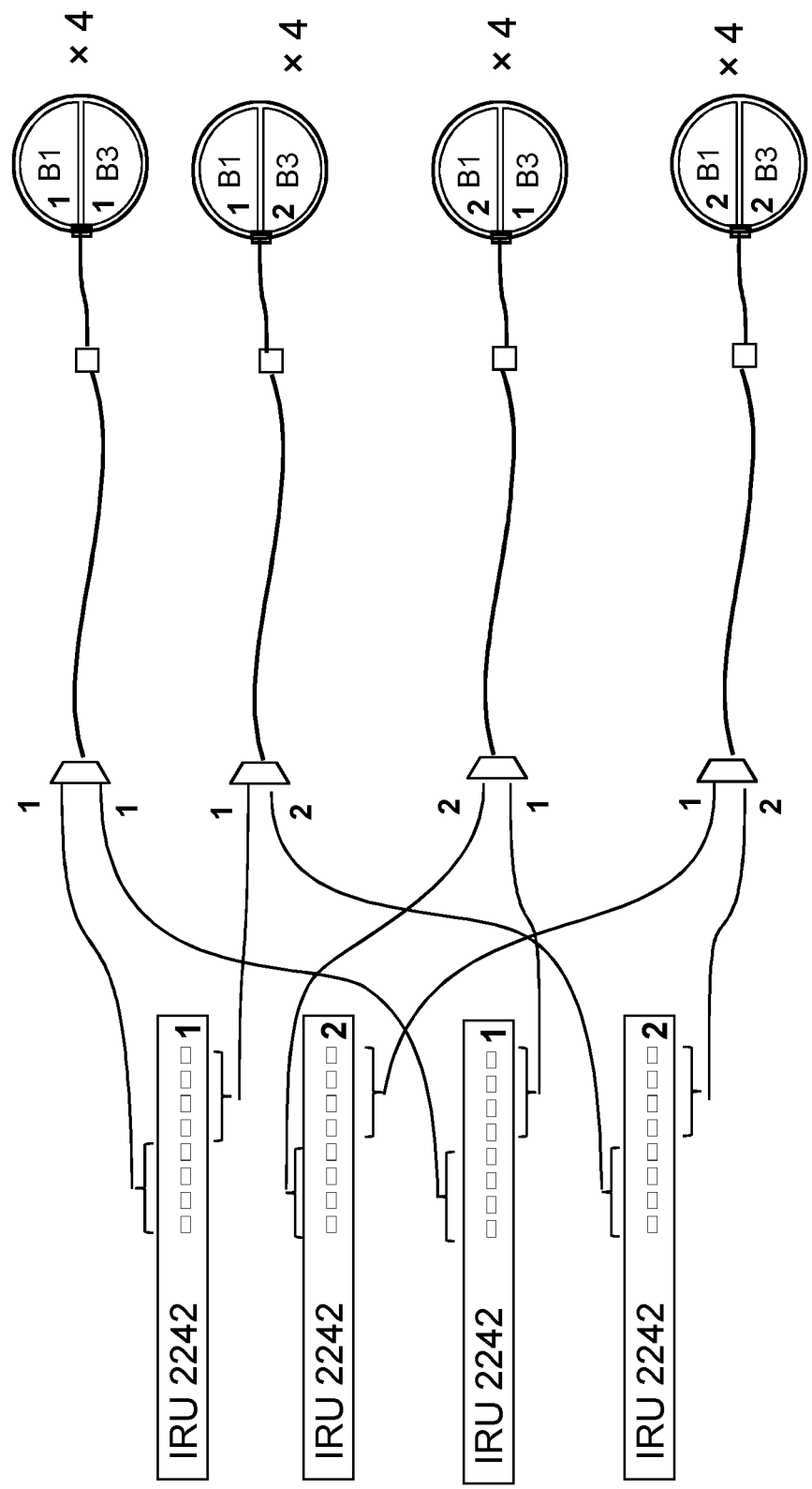
FIG. 10 illustrates an example cell border shifting configuration for a dual band radio dot system with dual band radio dots, according to certain embodiments.

FIG. 10 illustrates an example cell border shifting configuration for a dual band radio dot system with dual band radio dots, according to certain embodiments. Again, cell border shifting is realized by assigning 4 radio dots of each band to the same cell as their co-located counterpart while the remaining 4 radio dots are assigned to different cells.

Figure 4:
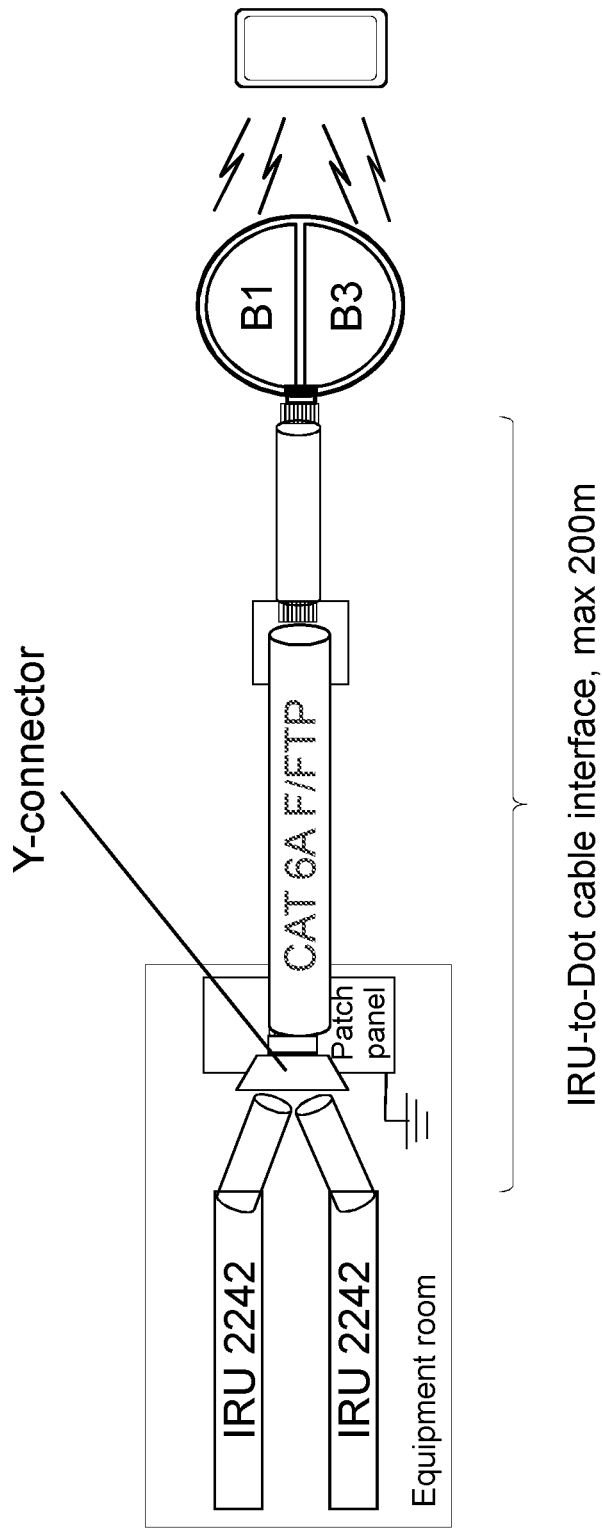
FIG. 4 illustrates a radio dot system with dual-band radio dots.
Figure 5:
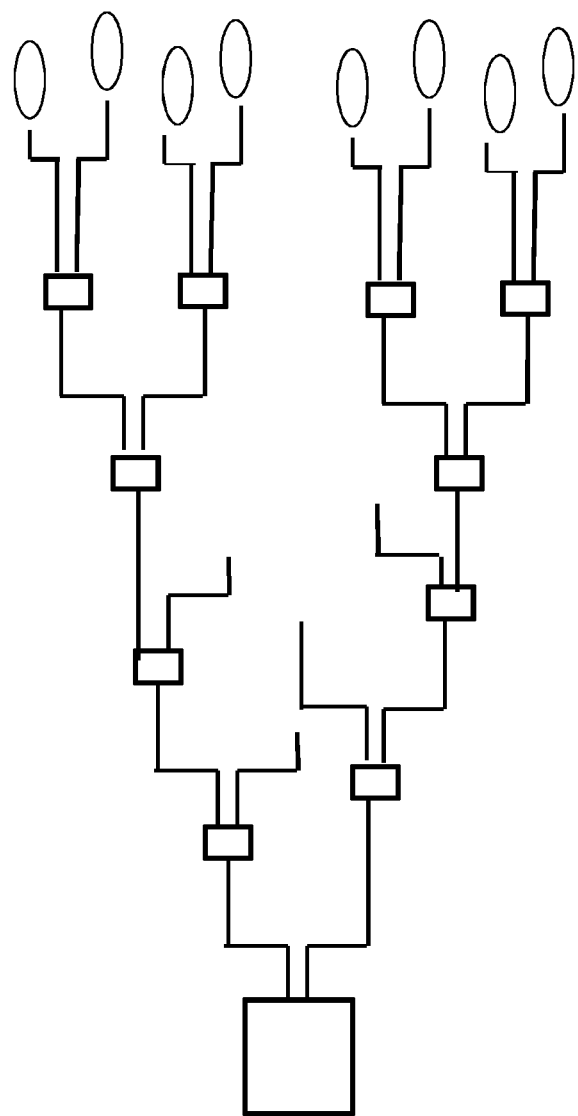
FIG. 5 illustrates a Distributed Antenna System (DAS).

For analogue interface, Y-connectors are used at the IRU end of the cable as in FIG. 4 described above to allow cable sharing. For digital (Ethernet) interface, Ethernet switches may be used instead. The Ethernet switches may be external or built into the IRUs.

Figures 11A, 11B, 11C:
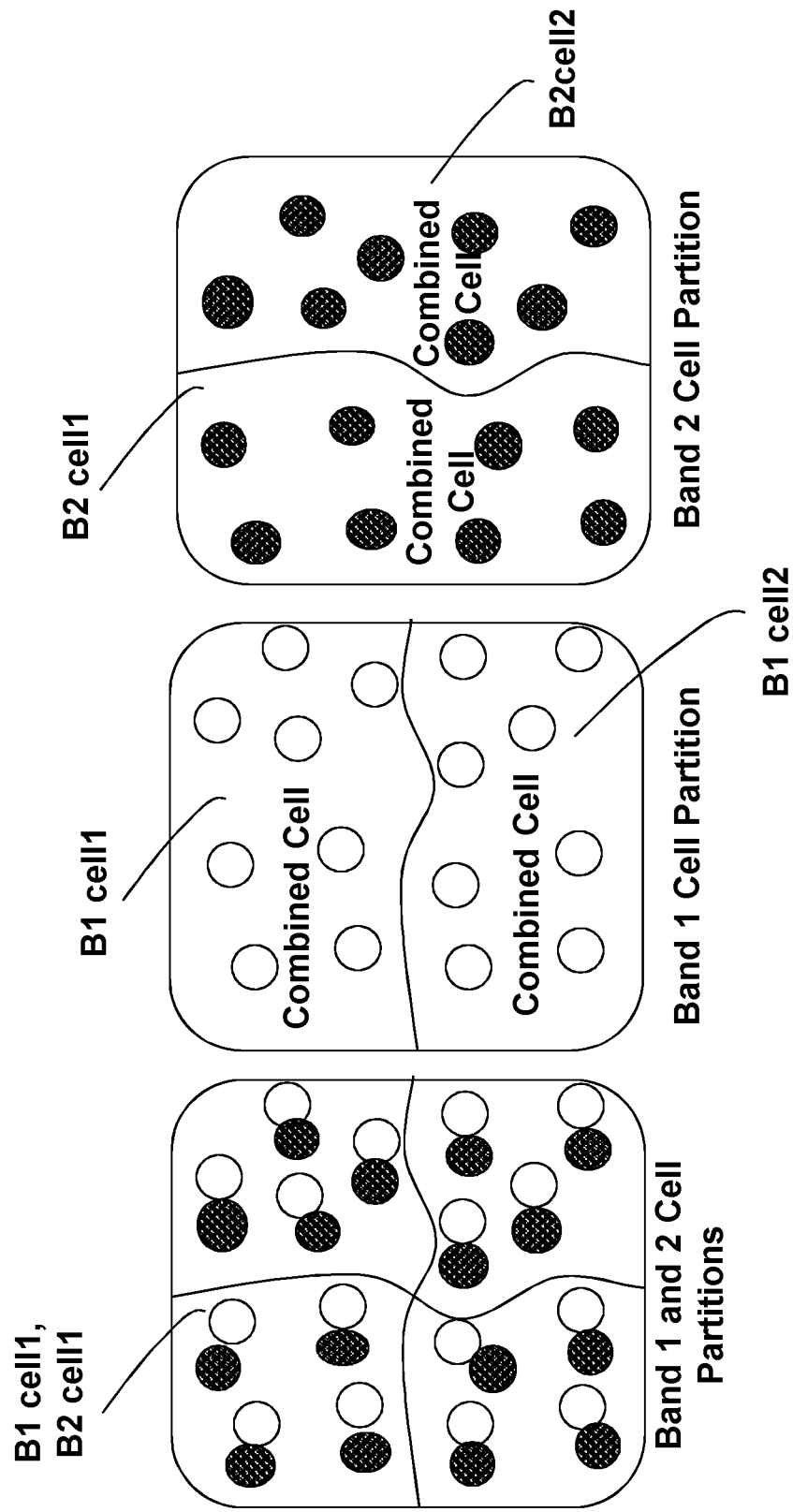
FIGS. 11A, 11B, and 11C illustrate cell border shifting for a combined cell, according to certain embodiments.

Instead of doing cell border shifting by rewiring between IRU and radio dot (for an analog interface) or using switching/multiplexing (for a digital interface), it is also possible to do cell border shifting on a combined cell level. FIGS. 11A-C illustrate cell border shifting for a combined cell, according to certain embodiments. Specifically, FIG. 11A shows four cells (represented by the four quadrants) each for B1 and B2 before combining. As depicted, each quadrant and band are associated to one IRU. FIG. 11B shows how combined cell is used to create two cells for B1 while FIG. 11C shows how combined cell is used to create two cells for B2.

In this example, the coverage areas of Band B1 and Band B2 are different. Band B1 coverage areas are larger in the vertical direction while Band B2 coverage area are larger in the horizontal direction. However, it is recognized that other alternatives might also be possible. As just one example, the same cell shape shifted horizontally and/or spatially may be used.

Cell border shifting may be applied to dual-band radio dot systems with single band and dual band dots, as shown in FIG. 3 and FIG. 4, respectively. In the depicted example of FIGS. 11A-C, dual band radio dots or pairs of co-located single band radio dots serving Band B1 and Band B2 are deployed to cover a confined coverage area. Furthermore, the coverage area may be large enough that at least two cells are required, and eight radio dots may constitute one cell. In the example depicted in FIGS. 11B and 11C, dots are assigned to cells such that a horizontal cell border for band B1, as well as a vertical cell border for band B2 is created. This effectively avoids common cell borders, such that there is only one remaining intersection in the middle of the coverage area, where the cells of Band B1 and Band B2 share the same boundary. If combined with carrier aggregation (CA), the scheduler can pick between the two bands and select the band with favorable SINR conditions. For instance, users located near the Band B1 cell boundary (horizontal line in FIG. 11B and FIG. 11A) are likely to experience lower interference and therefore superior SINR on Band B2. Likewise, users located near the Band B2 cell boundary (vertical line in FIG. 11C and FIG. 11A) are likely to experience lower interference and therefore superior SINR on Band B1. This leads to a more equally distributed aggregated throughput over the coverage as illustrated in the bottom of FIG. 11A.

In this case, IRUs (or other radio units) can be grouped (combined) differently on different frequency bands. As can be seen, the concepts disclosed herein work in a similar way as the previously illustrated embodiments.

Implementation of the techniques described herein may be made manually, according to certain embodiments. In other embodiments, the technique may be automated using radio network design using algorithms configured to meet requested design criteria.

Figure 12:
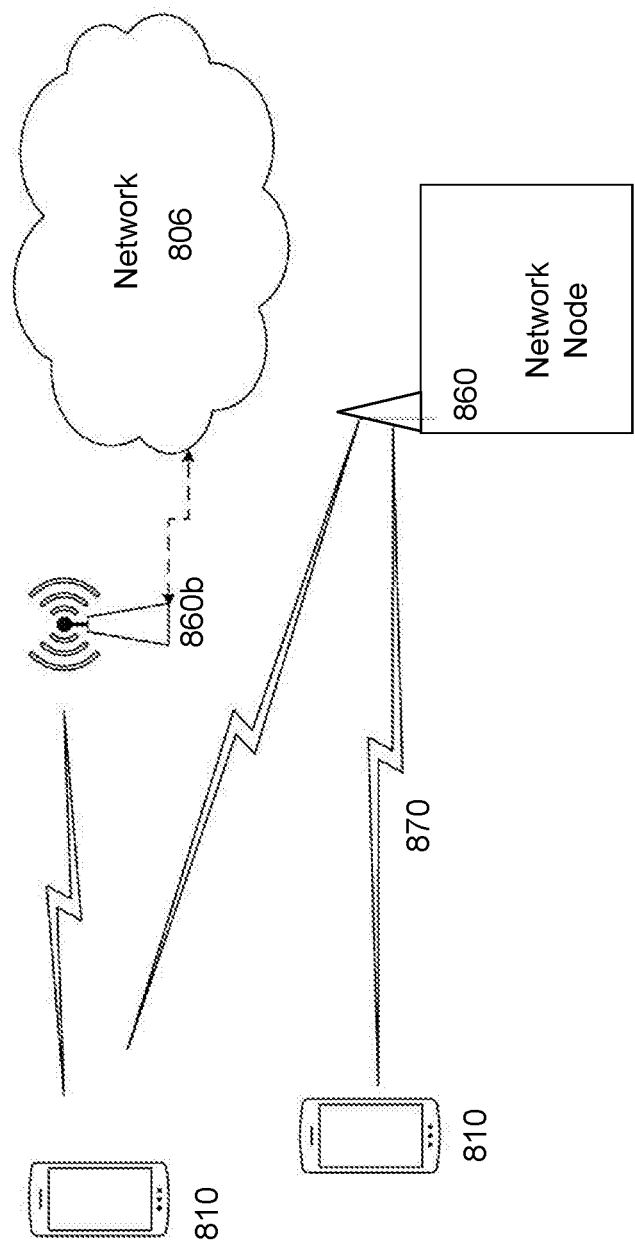
FIG. 12 illustrates a wireless network, according to certain embodiments.

1. Manual design planning and system configuration of antenna node placement and/or frequency band borders
2. Automated design planning of antenna node placement and/or frequency band borders in a dedicated small cell planning tool, such as, for example, Ericsson Indoor Planner
3. Automated system configuration of antenna node placement and/or frequency band borders of the coverage area, by software in radio products such as Ericsson Radio Dot System FIG. 12 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 12. For simplicity, the wireless network of FIG. 12 only depicts network 806, network nodes 860 and 860*b*, and WDs 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 13:
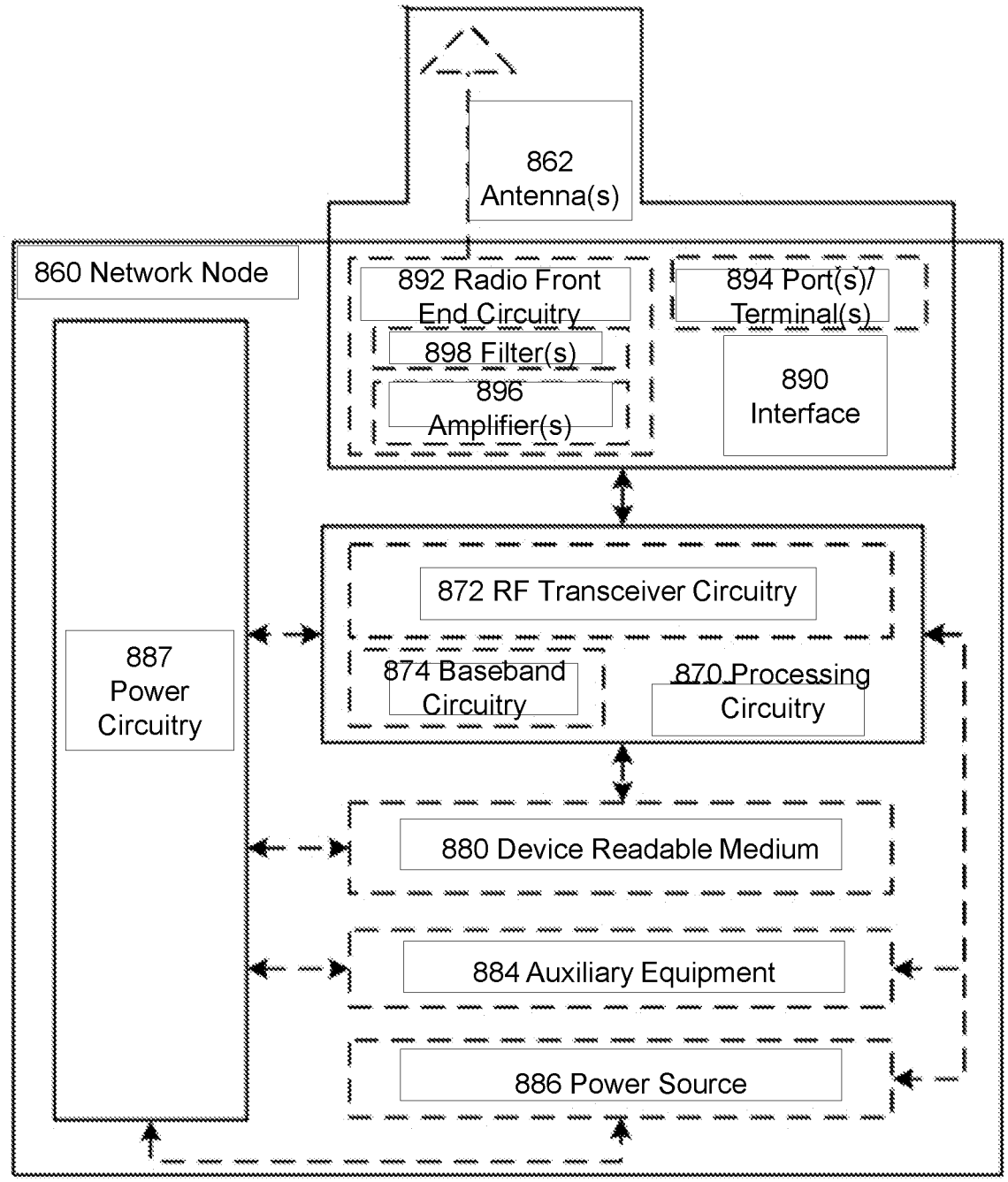
FIG. 13 illustrates an example network node, according to certain embodiments.

FIG. 13 illustrates an example network node 860, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node 860 includes processing circuitry 870, device readable medium 880, interface 890, auxiliary equipment 884, power source 886, power circuitry 887, and antenna 862. Although network node 860 illustrated in the example wireless network of FIG. 12 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units.

In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 13 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

Figure 14:
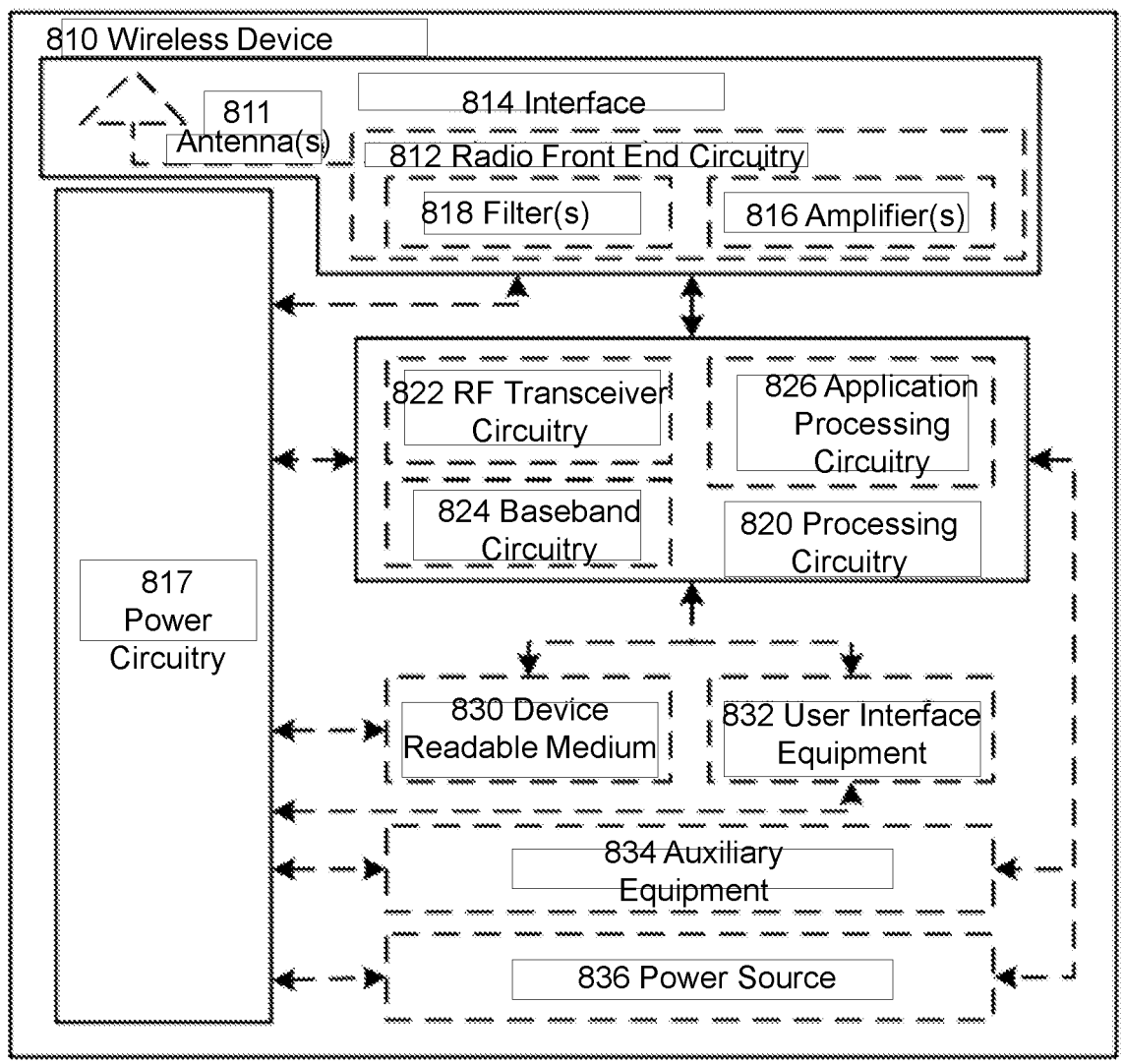
FIG. 14 illustrates an example wireless device, according to certain embodiments.

FIG. 14 illustrates an example wireless device (WD) 810, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 14, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry QQ112 and antenna 811. Radio front end circuitry QQ112 comprise one or more filters QQ118 and amplifiers QQ116. Radio front end circuitry 814 is connected to antenna 811 and processing circuitry 820 and is configured to condition signals communicated between antenna 811 and processing circuitry 820. Radio front end circuitry QQ112 may be coupled to or a part of antenna 811. In some embodiments, WD 810 may not include separate radio front end circuitry QQ112; rather, processing circuitry 820 may comprise radio front end circuitry and may be connected to antenna 811. Similarly, in some embodiments, some or all of RF transceiver circuitry QQ122 may be considered a part of interface 814. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna 811. Similarly, when receiving data, antenna 811 may collect radio signals which are then converted into digital data by radio front end circuitry QQ112. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry 820 of WD 810 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface 814. RF transceiver circuitry QQ122 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810 and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 15:
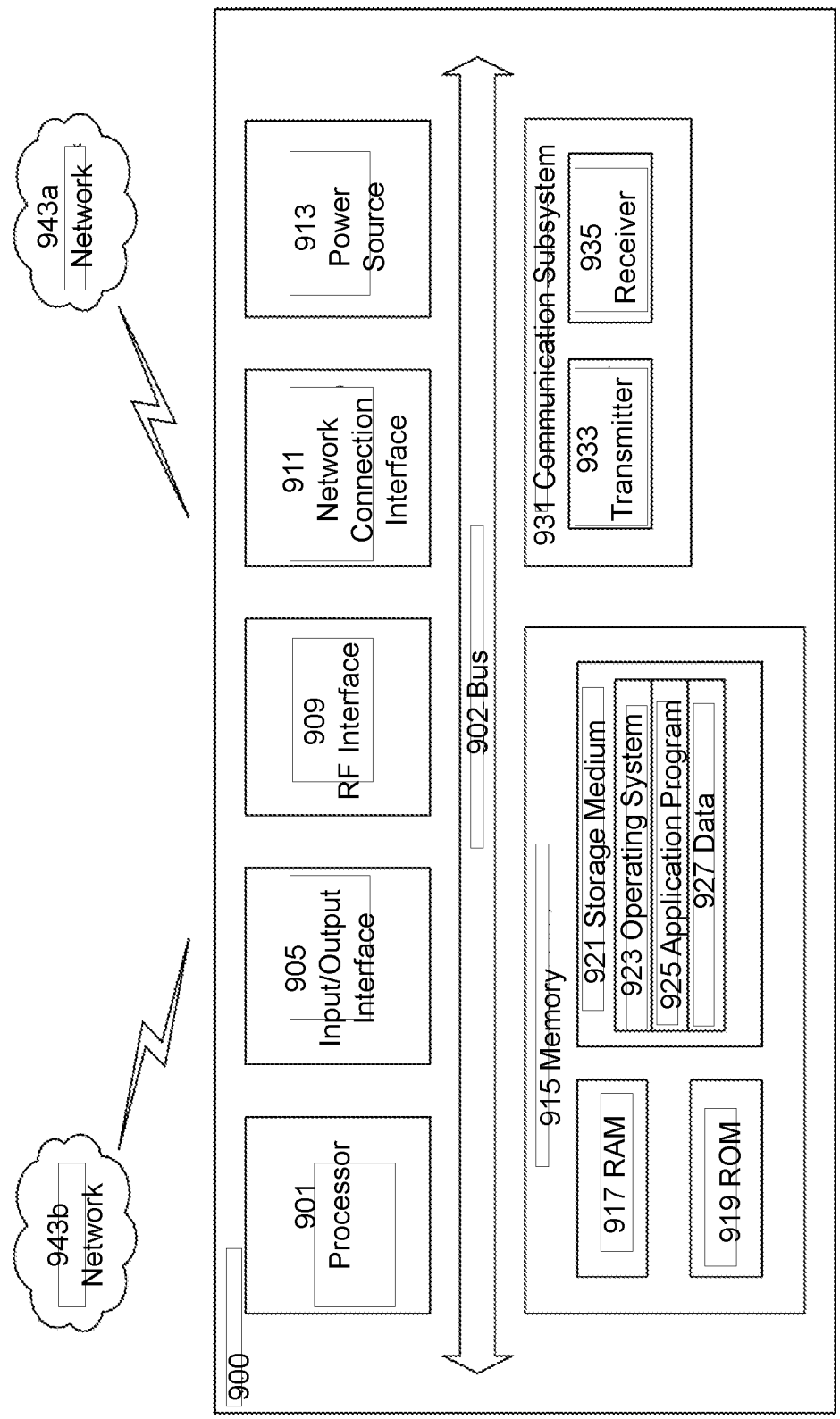
FIG. 15 illustrates one embodiment of a UE, according to certain embodiments.

FIG. 15 illustrates one embodiment of a UE 900, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3$^{rd}$ Generation Partnership Project (3GPP), including a NB-IoT UE, a machine type communication (MTC) UE, and/or an enhanced MTC (eMTC) UE. UE 900, as illustrated in FIG. 15, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 15 is a UE, the components discussed herein are equally applicable to a WD, and vice-versa.

In FIG. 15, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 15, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 15, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 15, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 16:
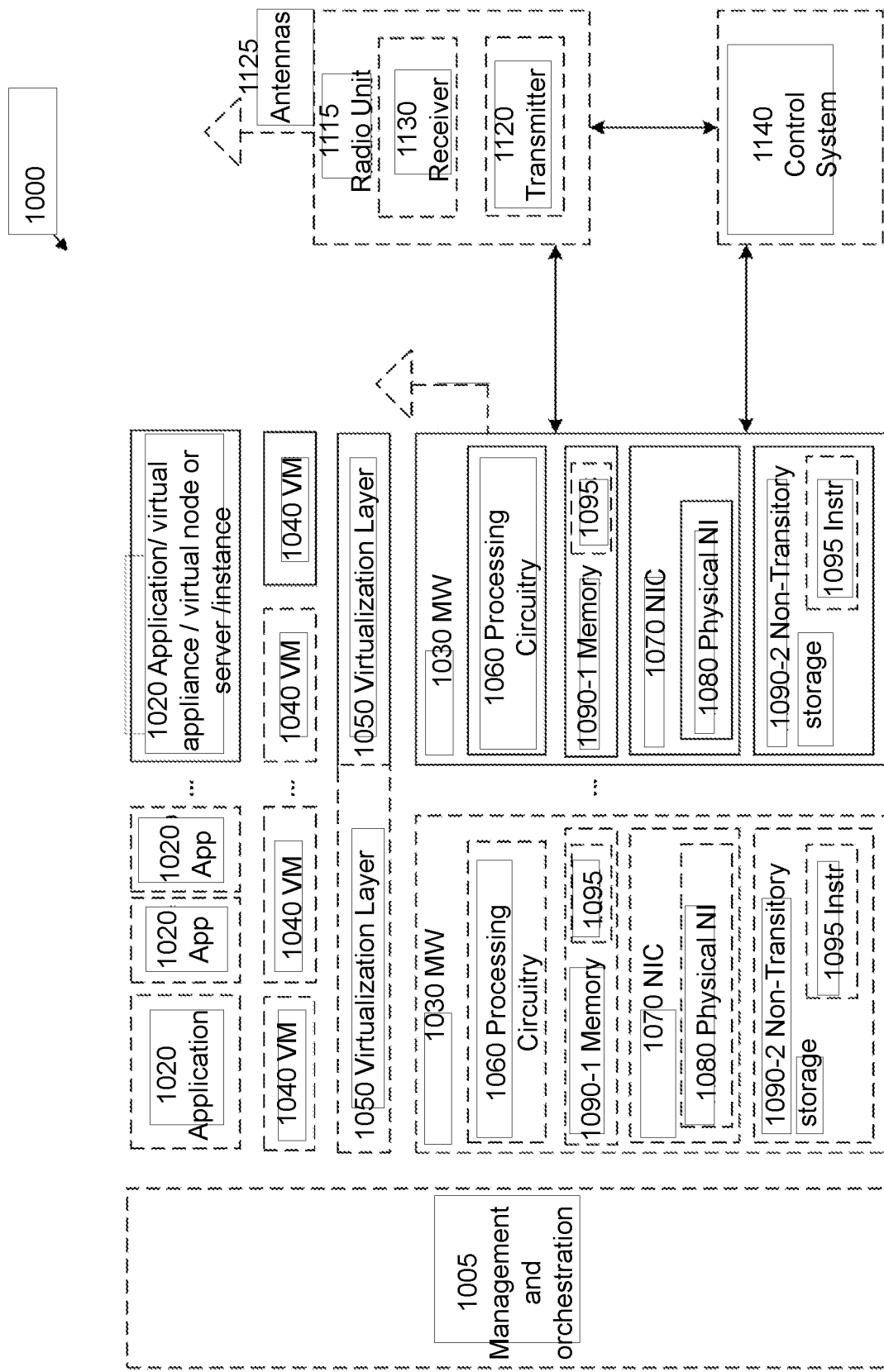
FIG. 16 illustrates a virtualization environment in which functions implemented by some embodiments may be virtualized, according to certain embodiments.

FIG. 16 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 16, hardware 1030 may be a standalone network node with generic or specific components. Hardware 1030 may comprise antenna 1125 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 1005, which, among others, oversees lifecycle management of applications 1020.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 16.

In some embodiments, one or more radio units 1115 that each include one or more transmitters 1120 and one or more receivers 1130 may be coupled to one or more antennas 1125. Radio units 1115 may communicate directly with hardware nodes 1030 via one or more appropriate network interfaces and may be used in combination with the virtual components to provide a virtual node with radio capabilities, such as a radio access node or a base station.

In some embodiments, some signaling can be affected with the use of control system 1140 which may alternatively be used for communication between the hardware nodes 1030 and radio units 1115.

Figure 17:
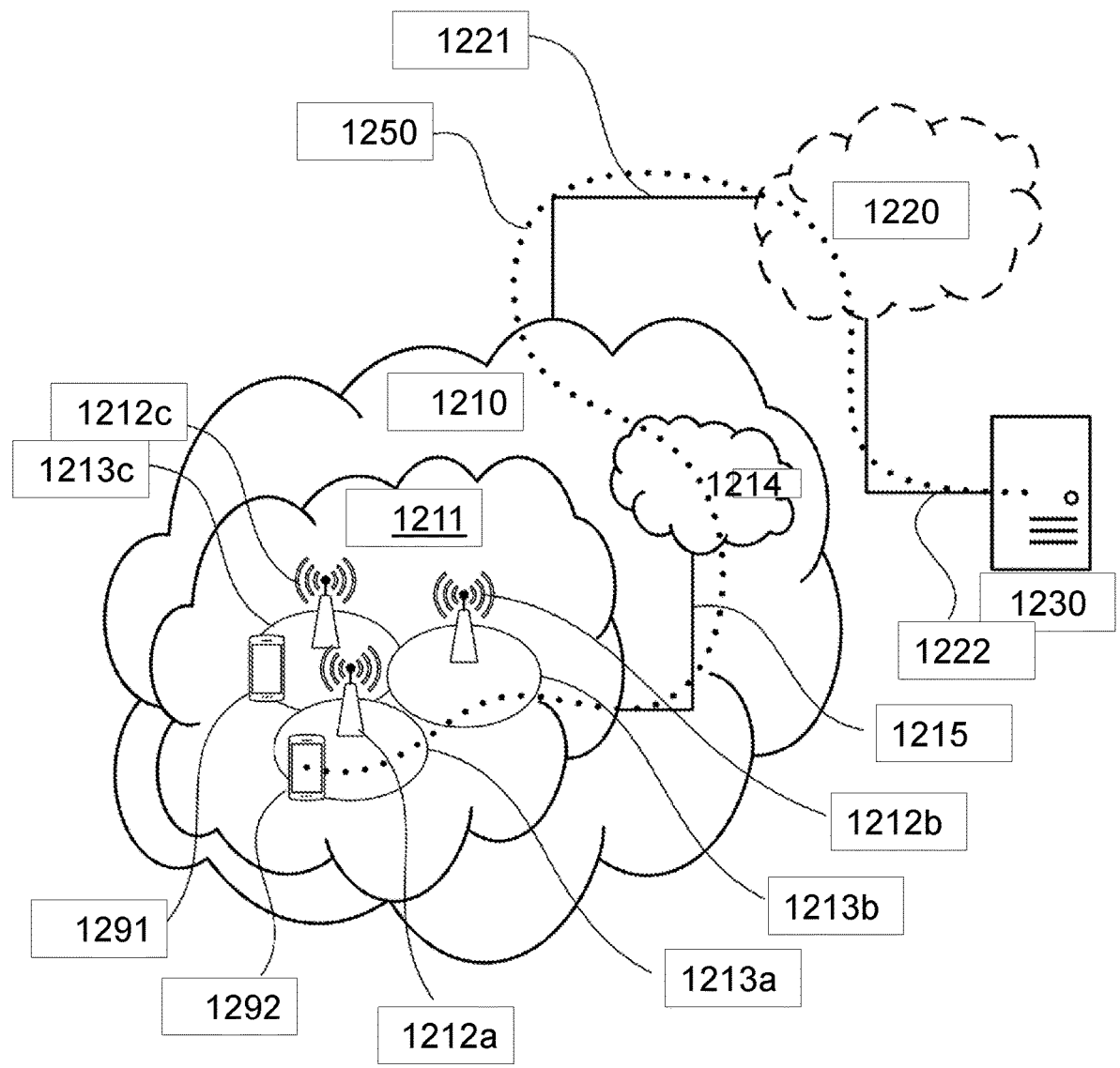
FIG. 17 illustrates a telecommunication network connected via an intermediate network to a host computer, according to certain embodiments.

FIG. 17 illustrates a telecommunication network connected via an intermediate network to a host computer in accordance with some embodiments.

With reference to FIG. 17, in accordance with an embodiment, a communication system includes telecommunication network 1210, such as a 3GPP-type cellular network, which comprises access network 1211, such as a radio access network, and core network 1214. Access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to core network 1214 over a wired or wireless connection 1215. A first UE 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 17 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Figure 18:
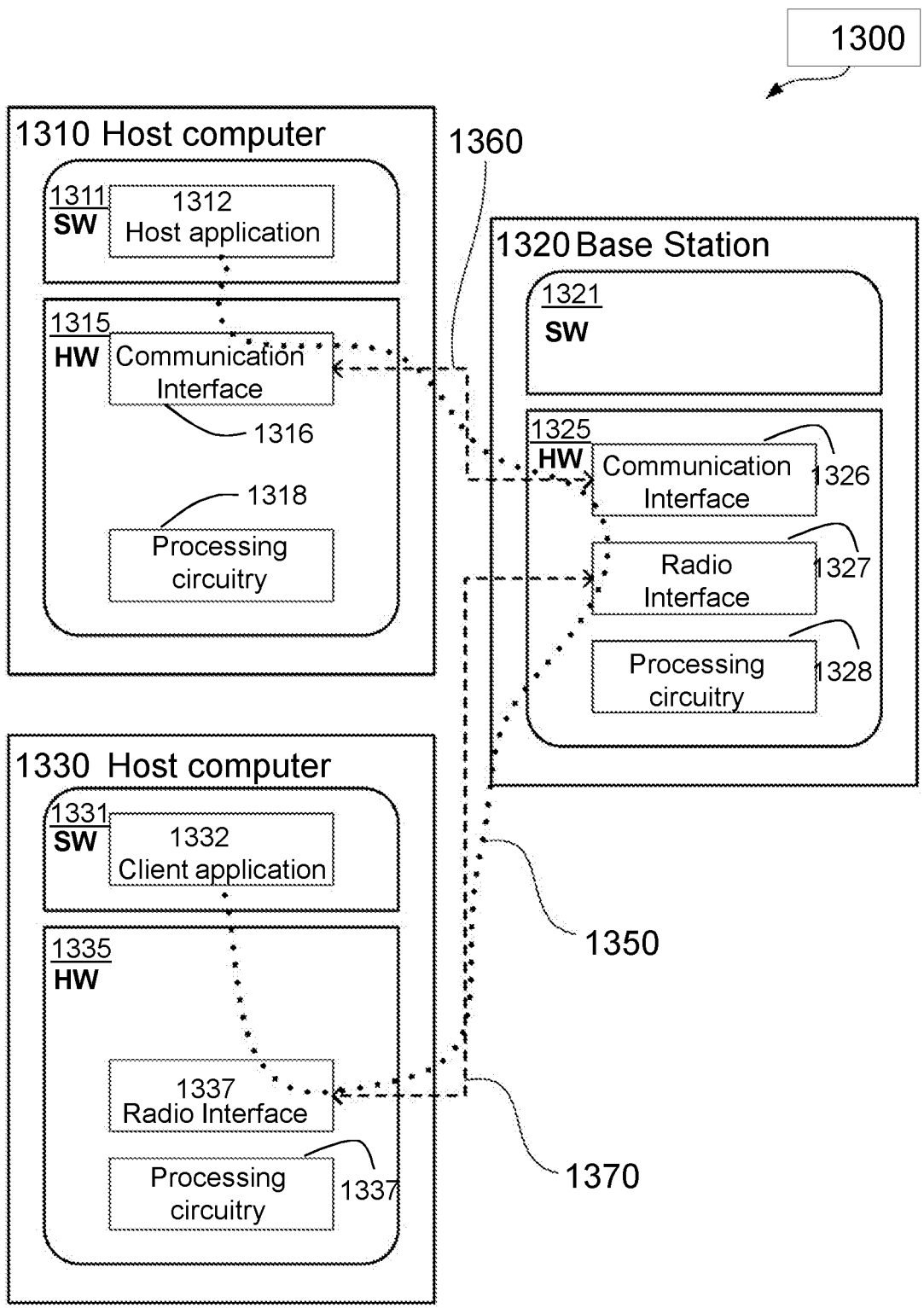
FIG. 18 illustrates a host computer communicating via a base station with a user equipment over a partially wireless connection, according to certain embodiments.

FIG. 18 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 18. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 14) served by base station 1320. Communication interface 1326 may be configured to facilitate connection 1360 to host computer 1310. Connection 1360 may be direct or it may pass through a core network (not shown in FIG. 16) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

It is noted that host computer 1310, base station 1320 and UE 1330 illustrated in FIG. 18 may be similar or identical to host computer 1230, one of base stations 1212a, 1212b, 1212c and one of UEs 1291, 1292 of FIG. 15, respectively. This is to say, the inner workings of these entities may be as shown in FIG. 18 and independently, the surrounding network topology may be that of FIG. 17.

In FIG. 18, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figures 19, 20:
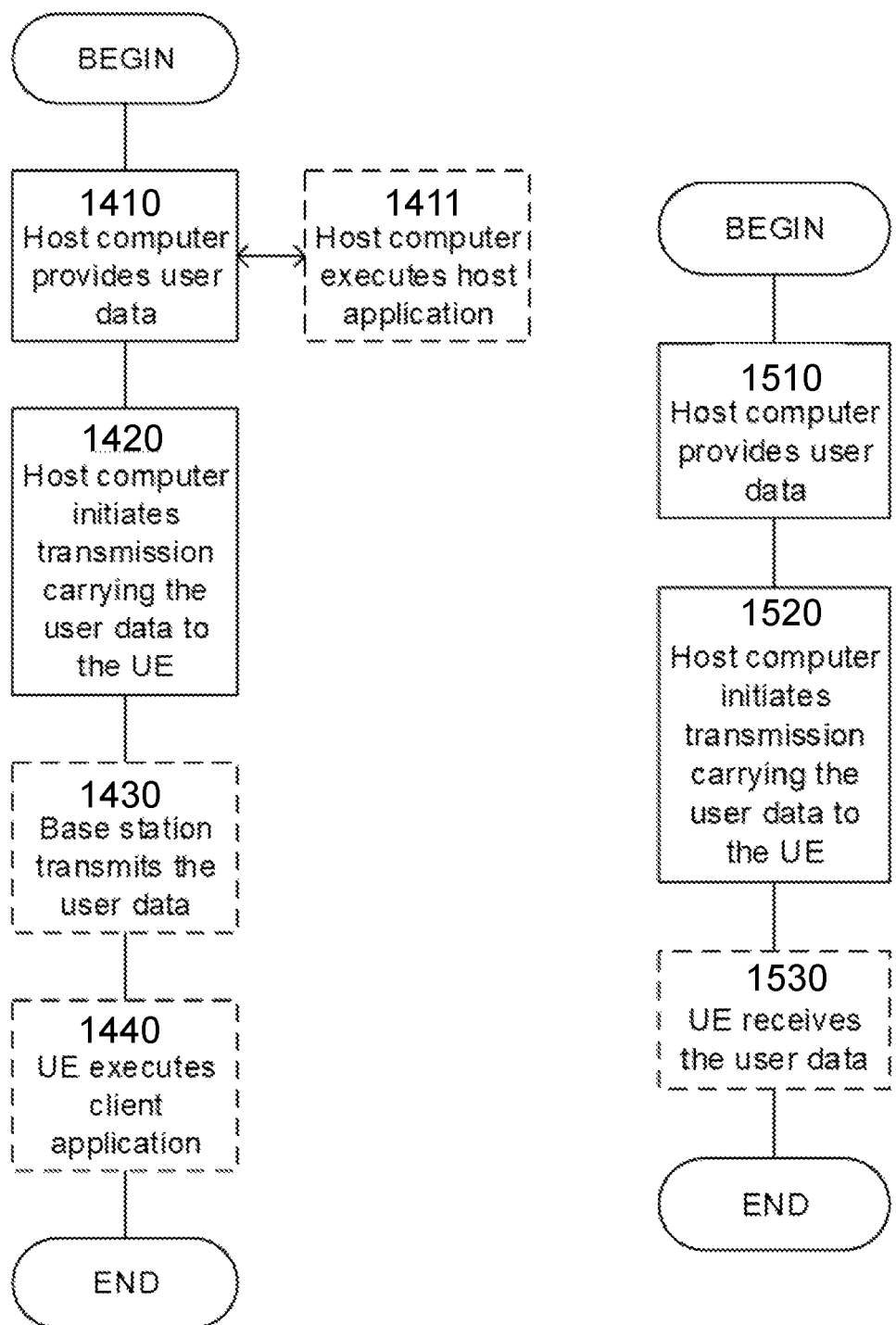
FIG. 19 illustrates a method implemented in a communication system, in accordance with one embodiment.
FIG. 20 illustrates a method implemented in a communication system, in accordance with one embodiment.

FIG. 19 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 19 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 20 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 20 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figures 21, 22:
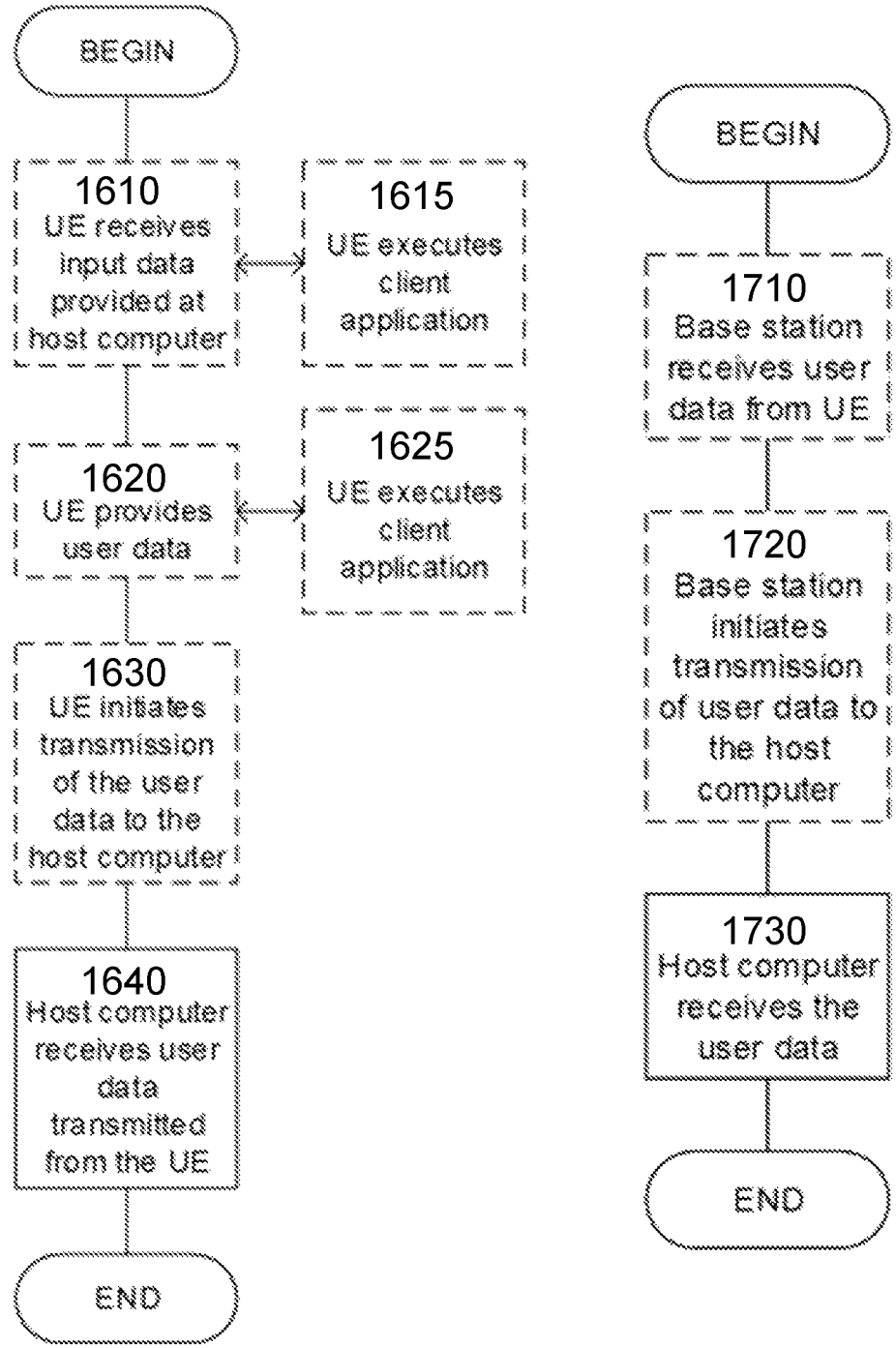
FIG. 21 illustrates a method implemented in a communication system, in accordance with one embodiment.
FIG. 22 illustrates g a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 21 will be included in this section. In step 1610 (which may be optional), the UE receives input data provided by the host computer. Additionally, or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 22 is a flowchart illustrating a method implemented in a communication system, in accordance with one embodiment. The communication system includes a host computer, a base station and a UE which may be those described with reference to FIGS. 17 and 18. For simplicity of the present disclosure, only drawing references to FIG. 22 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Figure 23:
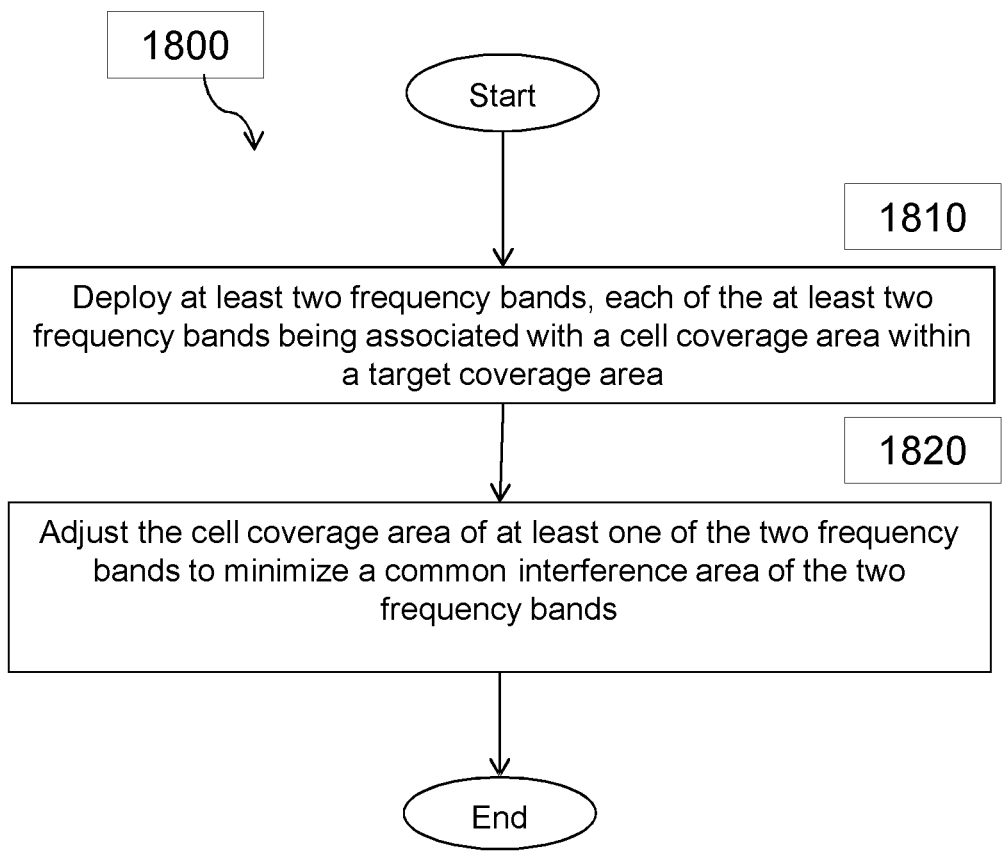
FIG. 23 depicts a method for cell border shifting for multiple frequency bands, according to certain embodiments.

FIG. 23 depicts a method 1800 for cell border shifting for multiple frequency bands, according to certain embodiments. At step 1810 at least two frequency bands are deployed. Each of the at least two frequency bands being associated with a cell coverage area within a target coverage area. The cell coverage area of at least one of the two frequency bands is adjusted at step 1820 to minimize a common interference area of the two frequency bands.

In a particular embodiment, the cell coverage area of the at least one of the two frequency bands may be adjusted in response to a signal quality measured by a wireless device within the target coverage area.

In a particular embodiment, adjusting the cell coverage area may include shifting at least one frequency band border across the target coverage area.

In a particular embodiment, adjusting the cell coverage area may include adjusting a placement of an antenna node.

In a particular embodiment, the method may further include applying distributed multiple input multiple output (MIMO) to increase a physical cell size of the cell coverage area of one or more of the at least two bands and/or improve performance on a border between the coverage area of a first of the at least two frequency bands and the coverage area of a second of the at least two frequency bands.

In a particular embodiment, applying distributed MIMO may include using a 4T4R MIMO realized over 8 or 16 2T2R antenna points.

In a particular embodiment, the cell coverage area of the at least one of the two frequency bands may be adjusted manually. In another particular embodiment, the cell coverage area of the at least one of the two frequency bands may be adjusted automatically.

In a particular embodiment, the cell coverage area of a first of the at least two frequency bands may be larger in a vertical direction than the cell coverage area of a second of the at least two frequency bands. Additionally, or alternatively, the cell coverage area of the second of the at least two frequency bands may be larger in a horizontal direction than the cell coverage area of the first of the at least two frequency bands.

In a particular embodiment, the cell coverage area of the first of the at least two frequency bands have a same cell shape as the cell coverage area of the second of the at least two frequency bands.

Figure 24:
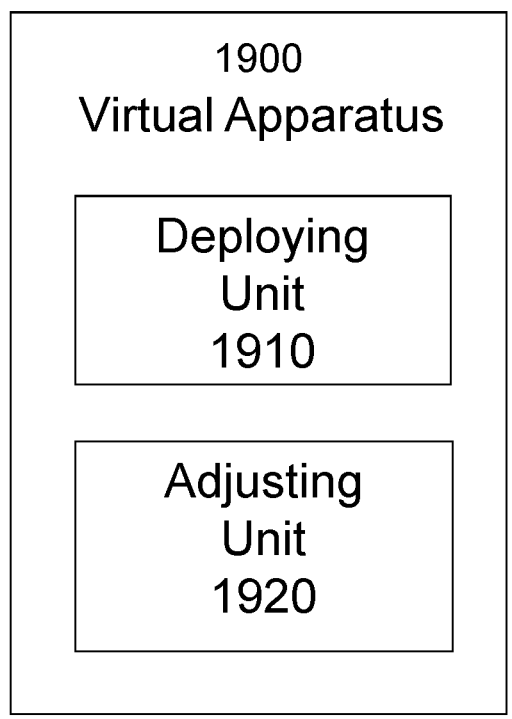
FIG. 24 illustrates a virtual apparatus in a wireless network, according to certain embodiments.

FIG. 24 illustrates a schematic block diagram of a virtual apparatus 1900 in a wireless network (for example, the wireless network shown in FIG. 12). The apparatus may be implemented in a wireless device or network node (e.g., wireless device 810 or network node 860 shown in FIG. 12). Apparatus 1900 is operable to carry out the example method described with reference to FIG. 23 and possibly any other processes or methods disclosed herein. It is also to be understood that the method of FIG. 23 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause deploying module 1910, adjusting module 1920, and any other suitable units of apparatus 1900 to perform corresponding functions according one or more embodiments of the present disclosure.

According to certain embodiments, deploying module 1910 may perform certain of the deploying functions of the apparatus 1900. For example, deploying module 1910 may deploy at least two frequency bands. Each of the at least two frequency bands being associated with a cell coverage area within a target coverage area.

According to certain embodiments, adjusting module 1920 may perform certain of the adjusting functions of the apparatus 1900. For example, adjusting module 1920 may adjust the cell coverage area of at least one of the two frequency bands to minimize a common interference area of the two frequency bands.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 25:
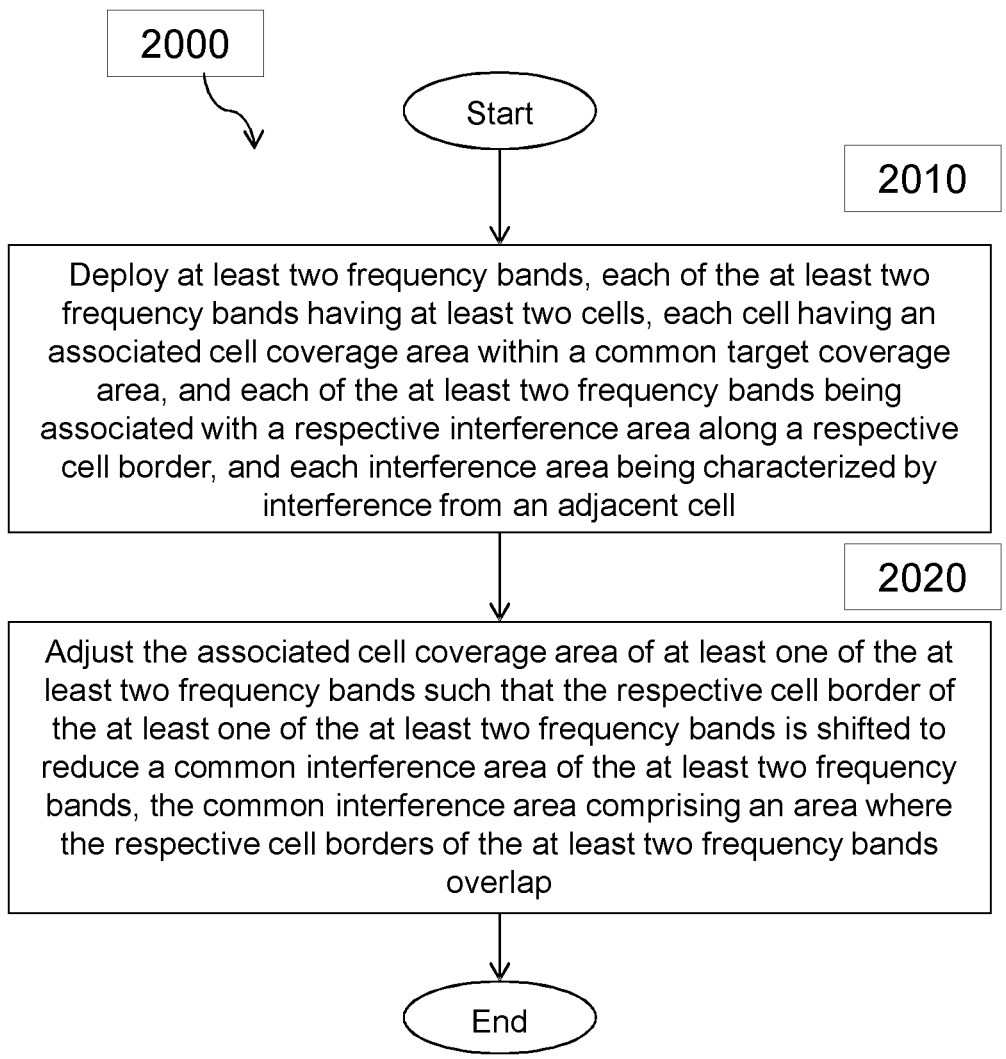
FIG. 25 depicts another method for cell border shifting for multiple frequency bands, according to certain embodiments.

FIG. 25 depicts another method 2000 by a network node 860 for shifting cell borders of multiple frequency bands, according to certain embodiments. At step 2010, network node 860 deploys at least two frequency bands. Each of the at least two frequency bands have at least two cells, and each cell has an associated cell coverage area within a common target coverage area. Each of the at least two frequency bands are associated with a respective interference area along a respective cell border, and each interference area is characterized by interference from an adjacent cell. According to a particular embodiment, for each frequency band, two or more TRPs are associated with each cell, and adjusting the associated cell coverage area of the at least one of the at least two frequency bands involves changing an association between TRPs and cells for at least one TRP in at least one of the frequency bands." In a particular embodiment, the associated cell coverage areas are provided by a small cell solution.

At step 2012, network node 860 adjusts the associated cell coverage area of at least one of the at least two frequency bands such that the respective cell border of the at least one of the at least two frequency bands is shifted to reduce a common interference area of the at least two frequency bands. The common interference area comprises an area where the respective cell borders of the at least two frequency bands overlap.

In a particular embodiment, adjusting the associated cell coverage area of the at least one of the at least two frequency bands includes spatially shifting only the cell coverage area associated with the at least one of the at least two frequency bands.

In a particular embodiment, the respective cell border of the at least one of the at least two frequency bands may be shifted in response to a signal quality measured by a wireless device within the target coverage area.

In a particular embodiment, adjusting the associated cell coverage area of at least one of the at least two frequency bands includes shifting at least one frequency band border across the target coverage area.

In a particular embodiment, adjusting the associated cell coverage area of at least one of the at least two frequency bands includes adjusting a placement of a transmission reception point (TRP).

In a particular embodiment, network node 860 may apply distributed MIMO to increase a physical cell size of the cell coverage area of the at least one of the at least two frequency bands and/or to improve performance in the common interference area of the at least two frequency bands.

In a particular embodiment, the adjustment of the associated cell coverage area of at least one of the at least two frequency bands is performed manually. In another embodiment, the adjustment of the associated cell coverage area of at least one of the at least two frequency bands is performed automatically.

In a particular embodiment, the associated cell coverage area of a first of the at least two frequency bands is larger in a vertical direction than the associated cell coverage area of a second of the at least two frequency bands. Additionally, or alternatively, the associated cell coverage area of the second of the at least two frequency bands is larger in a horizontal direction than the associated cell coverage area of the first of the at least two frequency bands.

In a particular embodiment, the associated cell coverage area of the first of the at least two frequency bands has a same cell shape as the associated cell coverage area of the second of the at least two frequency bands.

In a particular embodiment, the method may further include network node 860 determining that a first one of the at least two frequency bands has a more favorable signal interference to noise ratio than any others of the at least two frequency bands and assigning a wireless device 810 to the at least two frequency bands.

Figure 26:
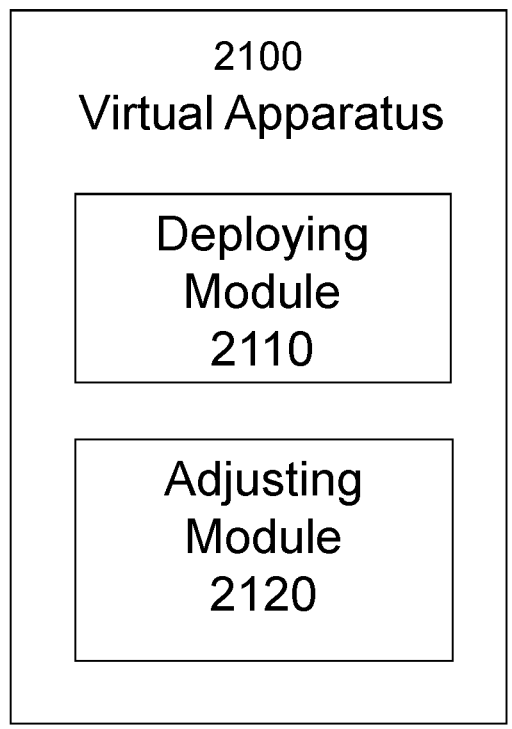
FIG. 26 illustrates another virtual apparatus in a wireless network, according to certain embodiments.

FIG. 26 illustrates a schematic block diagram of a virtual apparatus 2100 in a wireless network (for example, the wireless network shown in FIG. 12). The apparatus may be implemented in a wireless device or network node (e.g., wireless device 810 or network node 860 shown in FIG. 12). Apparatus 2100 is operable to carry out the example method described with reference to FIG. 25 and possibly any other processes or methods disclosed herein. It is also to be understood that the method of FIG. 25 is not necessarily carried out solely by apparatus 2100. At least some operations of the method can be performed by one or more other entities.

Virtual Apparatus 2100 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause deploying module 2110, adjusting module 2120, and any other suitable units of apparatus 2100 to perform corresponding functions according one or more embodiments of the present disclosure.

According to certain embodiments, deploying module 2110 may perform certain of the deploying functions of the apparatus 2100. For example, deploying module 2110 may deploy at least two frequency bands. Each of the at least two frequency bands have at least two cells, and each cell has an associated cell coverage area within a common target coverage area. Each of the at least two frequency bands are associated with a respective interference area along a respective cell border, and each interference area is characterized by interference from an adjacent cell.

According to certain embodiments, adjusting module 2120 may perform certain of the adjusting functions of the apparatus 2100. For example, adjusting module 2120 may adjust the associated cell coverage area of at least one of the at least two frequency bands such that the respective cell border of the at least one of the at least two frequency bands is shifted to reduce a common interference area of the at least two frequency bands. The common interference area comprises an area where the respective cell borders of the at least two frequency bands overlap.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

According to certain embodiments, a method for cell border shifting for multiple frequency bands includes deploying at least two frequency bands, each of the at least two frequency bands being associated with a cell coverage area within a target coverage area and adjusting the cell coverage area of at least one of the two frequency bands to minimize a common interference area of the two frequency bands.

Optionally, the cell coverage area of the at least one of the two frequency bands is adjusted in response to a signal quality measured by a wireless device within the target coverage area.

Optionally, adjusting the cell coverage area comprises shifting at least one frequency band border across the target coverage area.

Optionally, adjusting the cell coverage area comprises adjusting a placement of an antenna node.

Optionally, the method further includes applying distributed multiple input multiple output (MIMO) to increase a physical cell size of the cell coverage area of one or more of the at least two bands and/or improve performance on a border between the coverage area of a first of the at least two frequency bands and the coverage area of a second of the at least two frequency bands.

Optionally, applying distributed MIMO comprises using a 4T4R MIMO realized over 8 or 16 2T2R antenna points.

Optionally, the cell coverage area of the at least one of the two frequency bands is adjusted manually.

Optionally, the cell coverage area of the at least one of the two frequency bands is adjusted automatically.

Optionally, the cell coverage area of a first of the at least two frequency bands is larger in a vertical direction than the cell coverage area of a second of the at least two frequency bands.

Optionally, the cell coverage area of the second of the at least two frequency bands is larger in a horizontal direction than the cell coverage area of the first of the at least two frequency bands.

Optionally, the cell coverage area of the first of the at least two frequency bands has a same cell shape as the cell coverage area of the second of the at least two frequency bands.

According to certain embodiments, a computer program comprising instructions which when executed on a computer perform any of the methods described above.

According to certain embodiments, a computer program product comprising a computer program comprising instructions is executed on a computer perform any of the methods described above.

According to certain embodiments, a non-transitory computer readable medium stores instructions which when executed by a computer perform any of the methods of described above.

According to certain embodiments, a network node for cell border shifting for multiple frequency bands includes memory operable to store instructions and processing circuitry operable to execute the instructions to cause the wireless device to perform any of the methods performed above.

According to certain embodiments, a method implemented in a communication system including a host computer, a base station and a user equipment (UE) includes:

at the host computer, providing user data; and at the host computer, initiating a transmission carrying the user data to the UE via a cellular network comprising the base station, wherein the base station performs deploying at least two frequency bands, each of the at least two frequency bands being associated with a cell coverage area within a target coverage area; and adjusting the cell coverage area of at least one of the two frequency bands to minimize a common interference area of the two frequency bands.

Optionally, the method further includes, at the base station, transmitting the user data.

Optionally, the user data is provided at the host computer by executing a host application, and the method further comprises, at the UE, executing a client application associated with the host application.

Optionally, a method implemented in a communication system including a host computer, a base station and a user equipment (UE), includes:

at the host computer, receiving, from the base station, user data originating from a transmission which the base station has received from the UE, wherein the base station deploys at least two frequency bands, each of the at least two frequency bands being associated with a cell coverage area within a target coverage area; and adjusts the cell coverage area of at least one of the two frequency bands to minimize a common interference area of the two frequency bands.

Optionally, the method further includes, at the base station, receiving the user data from the UE.

Optionally, the method further includes, at the base station, initiating a transmission of the received user data to the host computer.

According to certain embodiments, a communication system including a host computer includes processing circuitry configured to provide user data and a communication interface configured to forward the user data to a cellular network for transmission to a user equipment (UE), wherein the cellular network comprises a base station having a radio interface and processing circuitry, the base station's processing circuitry configured to deploy at least two frequency bands, each of the at least two frequency bands being associated with a cell coverage area within a target coverage area and adjust the cell coverage area of at least one of the two frequency bands to minimize a common interference area of the two frequency bands.

Optionally, the communication system further includes the base station.

Optionally, the communication system further includes the UE, wherein the UE is configured to communicate with the base station.

Optionally, the processing circuitry of the host computer is configured to execute a host application, thereby providing the user data and the UE comprises processing circuitry configured to execute a client application associated with the host application.

According to certain embodiments, a communication system including a host computer comprising a communication interface configured to receive user data originating from a transmission from a user equipment (UE) to a base station, wherein the base station comprises a radio interface and processing circuitry, the base station's processing circuitry configured to deploy at least two frequency bands, each of the at least two frequency bands being associated with a cell coverage area within a target coverage area and adjust the cell coverage area of at least one of the two frequency bands to minimize a common interference area of the two frequency bands.

Optionally, the communication system further includes the base station.

Optionally, the communication system further includes the UE, wherein the UE is configured to communicate with the base station.

Optionally, the processing circuitry of the host computer is configured to execute a host application and the UE is configured to execute a client application associated with the host application, thereby providing the user data to be received by the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation 3GPP Mobile Telephony System
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
Band Radio Frequency Operating Range
BCCH Broadcast Control Channel
BCH Broadcast Channel
CA Carrier Aggregation (combining of frequency bands into a larger user device bitpipe)
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DAS Distributed Antenna System
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution ($4^{th}$ Generation 3GPP Mobile Telephy System)
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MIMO Multiple Input Multiple Output, aggregation of multiple radio transmissions within same band
MME Mobility Management Entity
MSC Mobile Switching Center
NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel
QAM Quadrature Amplitude Modulation
RAB Radio Access Bearer
RAN Radio Access Network
RANAP Radio Access Network Application Part
RAT Radio Access Technology
RF Radio Frequency
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference RWR Release with Redirect
SCH Synchronization Channel
SCell Secondary Cell
SDU Service Data Unit
SFN System Frame Number
SGW Serving Gateway
SI System Information
SIB System Information Block
SINR Signal to Interference and Noise Ratio
SNR Signal to Noise Ratio
S-NSSAI Single Network Slice Selection Assistance Information
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a network node for shifting cell borders of multiple frequency bands, the method comprising:
deploying at least two frequency bands, each of the at least two frequency bands having at least two cells, each cell having an associated cell coverage area within a common target coverage area, each of the at least two frequency bands being associated with a respective interference area along a respective cell border, each interference area being characterized by interference from an adjacent cell;
adjusting the associated cell coverage area of at least one of the at least two frequency bands such that the respective cell border of the at least one of the at least two frequency bands is shifted to reduce a common interference area of the at least two frequency bands, the common interference area comprising an area where the respective cell borders of the at least two frequency bands overlap;
determining that a first one of the at least two frequency bands has a more favorable signal interference to noise ratio than any others of the at least two frequency bands; and
assigning a wireless device to the at least two frequency bands.

2. A network node for cell border shifting for multiple frequency bands, the network node comprising:
memory operable to store instructions; and
processing circuitry operable to execute the instructions to cause the network node to:
deploy at least two frequency bands, each of the at least two frequency bands having at least two cells, each cell having an associated cell coverage area within a common target coverage area, each of the at least two frequency bands being associated with a respective interference area along a respective cell border, each interference area being characterized by interference from an adjacent cell;
adjust the associated cell coverage area of at least one of the at least two frequency bands such that the respective cell border of the at least one of the at least two frequency bands is shifted to reduce a common interference area of the at least two frequency bands, the common interference area comprising an area where the respective cell borders of the at least two frequency bands overlap;
determine that a first one of the at least two frequency bands has a more favorable signal interference to noise ratio than any others of the at least two frequency bands; and
assign a wireless device to the at least two frequency bands.

3. The network node of claim 2, wherein for each frequency band, two or more transmission reception points (TRPs) are associated with each cell, and wherein adjusting the associated cell coverage area of the at least one of the at least two frequency bands involves changing an association between TRPs and cells for at least one TRP in at least one of the frequency bands.

4. The network node of claim 3, wherein the associated cell coverage areas are provided by a small cell solution.

5. The network node of claim 2, wherein, when adjusting the associated cell coverage area of the at least one of the at least two frequency bands such that the respective cell border of the at least one of the at least two frequency bands is shifted, the processing circuitry is operable to execute the instructions to cause the network node to:
spatially shift only the cell coverage area associated with the at least one of the at least two frequency bands.

6. The network node of claim 2, wherein the respective cell border of the at least one of the at least two frequency bands is shifted in response to a signal quality measured by a wireless device within the target coverage area.

7. The network node of claim 2, wherein, when adjusting the associated cell coverage area of at least one of the at least two frequency bands, the processing circuitry is operable to execute the instructions to cause the network node to adjust a placement of a transmission reception point (TRP).

8. The network node of claim 2, wherein the processing circuitry is operable to execute the instructions to cause the network node to apply distributed multiple input multiple output (MIMO) to increase a physical cell size of the cell coverage area of the at least one of the at least two frequency bands or to improve performance in the common interference area of the at least two frequency bands.

9. The network node of claim 2, wherein adjusting the associated cell coverage area of at least one of the at least two frequency bands is performed manually.

10. The network node of claim 2, wherein adjusting the associated cell coverage area of at least one of the at least two frequency bands is performed automatically.

11. The network node of claim 2, wherein the associated cell coverage area of a first of the at least two frequency bands is larger in a vertical direction than the associated cell coverage area of a second of the at least two frequency bands.

12. The network node of claim 2, wherein the associated cell coverage area of the second of the at least two frequency bands is larger in a horizontal direction than the associated cell coverage area of the first of the at least two frequency bands.

13. The network node of claim 2, wherein the associated cell coverage area of the first of the at least two frequency bands has a same cell shape as the associated cell coverage area of the second of the at least two frequency bands.

14. A method for cell border shifting for multiple frequency bands, the method comprising:
deploying at least two frequency bands, each of the at least two frequency bands being associated with a cell coverage area within a target coverage area; and
adjusting the cell coverage area of at least one of the two frequency bands to minimize a common interference area of the two frequency bands;
wherein the cell coverage area of a first of the at least two frequency bands is larger in a vertical direction than the cell coverage area of a second of the at least two frequency bands.

15. The method of claim 14, wherein the cell coverage area of the at least one of the two frequency bands is adjusted in response to a signal quality measured by a wireless device within the target coverage area.

16. The method of claim 14, wherein adjusting the cell coverage area comprises shifting at least one frequency band border across the target coverage area.

17. The method of claim 14 wherein adjusting the cell coverage area comprises adjusting a placement of an antenna node.

18. The method of claim 14, further comprising applying distributed multiple input multiple output (MIMO) to increase a physical cell size of the cell coverage area of one or more of the at least two bands or improve performance on a border between the coverage area of a first of the at least two frequency bands and the coverage area of a second of the at least two frequency bands.

19. The method of claim 18, wherein applying distributed MIMO comprises using a 4T4R MIMO realized over 8 or 16 2T2R antenna points.

20. The method of claim 14, wherein the cell coverage area of the at least one of the two frequency bands is adjusted manually.

21. The method of claim 14, wherein the cell coverage area of the at least one of the two frequency bands is adjusted automatically.

22. The method of claim 14, wherein the cell coverage area of the second of the at least two frequency bands is larger in a horizontal direction than the cell coverage area of the first of the at least two frequency bands.

23. The method of claim 14, wherein the cell coverage area of the first of the at least two frequency bands has a same cell shape as the cell coverage area of the second of the at least two frequency bands.

24. A network node for cell border shifting for multiple frequency bands, the network node comprising:
memory operable to store instructions; and
processing circuitry operable to execute the instructions to cause the network node to:
deploy at least two frequency bands, each of the at least two frequency bands being associated with a cell coverage area within a target coverage area; and
adjust the cell coverage area of at least one of the two frequency bands to minimize a common interference area of the two frequency bands;
wherein the cell coverage area of a first of the at least two frequency bands is larger in a vertical direction than the cell coverage area of a second of the at least two frequency bands.

* * * * *